United States Patent
Taniguchi

(10) Patent No.: US 11,521,429 B2
(45) Date of Patent: Dec. 6, 2022

(54) INFORMATION PROCESSING METHOD AND NON-TRANSITORY COMPUTER-READABLE STORAGE MEDIUM

(71) Applicant: LINE Corporation, Tokyo (JP)

(72) Inventor: Tomohiko Taniguchi, Tokyo (JP)

(73) Assignee: LINE CORPORATION, Toyko (JP)

( * ) Notice: Subject to any disclaimer, the term of this patent is extended or adjusted under 35 U.S.C. 154(b) by 412 days.

(21) Appl. No.: 16/182,066

(22) Filed: Nov. 6, 2018

(65) Prior Publication Data

US 2019/0073838 A1 Mar. 7, 2019

Related U.S. Application Data

(63) Continuation of application No. 14/839,423, filed on Aug. 28, 2015, now abandoned.

(30) Foreign Application Priority Data

Feb. 26, 2015 (JP) .................................. 2015-037375

(51) Int. Cl.
*G07B 15/02* (2011.01)
*G06Q 30/02* (2012.01)
*G06Q 50/30* (2012.01)

(52) U.S. Cl.
CPC ......... *G07B 15/02* (2013.01); *G06Q 30/0284* (2013.01); *G06Q 50/30* (2013.01)

(58) Field of Classification Search
CPC .... G07B 15/02; G06Q 30/0284; G06Q 50/30; G06Q 10/02
See application file for complete search history.

(56) References Cited

U.S. PATENT DOCUMENTS

2011/0009098 A1* 1/2011 Kong ..................... G08G 1/202
   455/457
2011/0153495 A1* 6/2011 Dixon .................... G06Q 20/10
   705/39

(Continued)

FOREIGN PATENT DOCUMENTS

CN   102156941 A    8/2011
CN   102706359 A   10/2012

(Continued)

OTHER PUBLICATIONS

G. Alli et al., "Green Move: Towards next generation sustainable smartphone-based vehicle sharing," 2012 Sustainable Internet and ICT for Sustainability (SustainIT), 2012, pp. 1-5. (Year: 2012).*

(Continued)

*Primary Examiner* — Emmett K. Walsh
(74) *Attorney, Agent, or Firm* — Harness, Dickey & Pierce, P.L.C.

(57) ABSTRACT

A server device includes an identification information obtaining unit, a position information specifying unit, a storage unit, a percentage calculating unit, and a fare calculating unit. The identification information obtaining unit obtains operation identification information for identifying an operation of a vehicle and user identification information for identifying users who utilize the operation. The position information specifying unit specifies riding position information and drop off position information on the individual users. The storage unit stores the operation identification information, the user identification information, the riding position information, and the drop off position information in association with one another. The percentage calculating unit calculates percentages of an operation fare for the operation to be paid by the individual users. The fare (Continued)

calculating unit calculates amounts to be paid by the individual users.

20 Claims, 28 Drawing Sheets

(56) References Cited

U.S. PATENT DOCUMENTS

| | | | |
|---|---|---|---|
| 2011/0202393 A1 | 8/2011 | DeWakar et al. | |
| 2012/0041675 A1* | 2/2012 | Juliver | G06Q 30/0283 701/465 |
| 2012/0323642 A1 | 12/2012 | Camp et al. | |
| 2013/0238167 A1 | 9/2013 | Stanfield et al. | |
| 2014/0082069 A1* | 3/2014 | Varoglu | G06Q 50/01 709/204 |
| 2014/0094143 A1* | 4/2014 | Ayotte | H04W 4/80 455/411 |
| 2014/0129951 A1* | 5/2014 | Amin | G06Q 20/10 715/738 |
| 2015/0095198 A1* | 4/2015 | Eramian | G06Q 30/0629 705/26.64 |
| 2015/0149320 A1 | 5/2015 | Smirin | |
| 2015/0254581 A1* | 9/2015 | Brahme | G06F 16/29 705/5 |
| 2015/0302384 A1* | 10/2015 | Aadi | G06Q 20/29 705/40 |
| 2016/0012461 A1* | 1/2016 | Paul | G06Q 30/0207 705/5 |
| 2016/0071082 A1* | 3/2016 | Driscoll | G06Q 20/145 705/13 |
| 2016/0092856 A1* | 3/2016 | Lee | G06Q 20/18 705/39 |
| 2016/0171637 A1 | 6/2016 | Rai | |

FOREIGN PATENT DOCUMENTS

| | | |
|---|---|---|
| CN | 103514737 A | 1/2014 |
| CN | 104144492 A | 11/2014 |
| JP | 2003-233656 A | 8/2003 |
| JP | 2004-318393 A | 11/2004 |
| JP | 2004-362271 A | 12/2004 |
| JP | 2005-292946 A | 10/2005 |
| JP | 2009-73242 A | 4/2009 |
| JP | 2013-214167 A | 10/2013 |
| JP | 2014-75727 A | 4/2014 |
| JP | 2014-157547 A | 8/2014 |
| JP | 2019-046486 A | 3/2019 |
| KR | 10-2006-0039746 A | 5/2006 |
| KR | 2013-0037133 A | 4/2013 |

OTHER PUBLICATIONS

Korean Office Action dated Jan. 21, 2019 for corresponding Korean Application No. 10-2017-7021554.
Japanese Office Action dated Jan. 7, 2020 for corresponding Japanese Application No. 2018-199505.
Chinese Office Action dated Apr. 1, 2020 for corresponding Chinese Application No. 201680012048.1.
Full English machine-translation of JP-2003-233656.
Japanese Office Action dated Jul. 28, 2020 for corresponding Japanese Application No. 2018-199505.
Chinese Office Action dated Sep. 28. 2020 for corresponding Chinese Application No. 201680012048.1.
Chinese Office Action dated Dec. 22, 2020 for corresponding Chinese Application No. 201680012048.1.
Notice of Same Date Filing of Equivalent Applications by Same Applicant drafted on Dec. 16, 2021 issued in corresponding Japanese Patent Application No. 2020-175749.
Notice of Reasons for Refusal drafted on Dec. 16, 2021 issued in corresponding Japanese Patent Application No. 2020-175749.
International Search Report and Written Opinion for the PCT application No. PCT/JP2016/053757 dated Mar. 29, 2016.
Korean Office Action dated Jul. 13, 2018 by the Korean Patent Office for Korean Patent Application No. 10-2017-7021554 (no English translation).
Japanese Office Action dated Jul. 3, 2018 for corresponding Japanese Application No. 2015-037375.

* cited by examiner

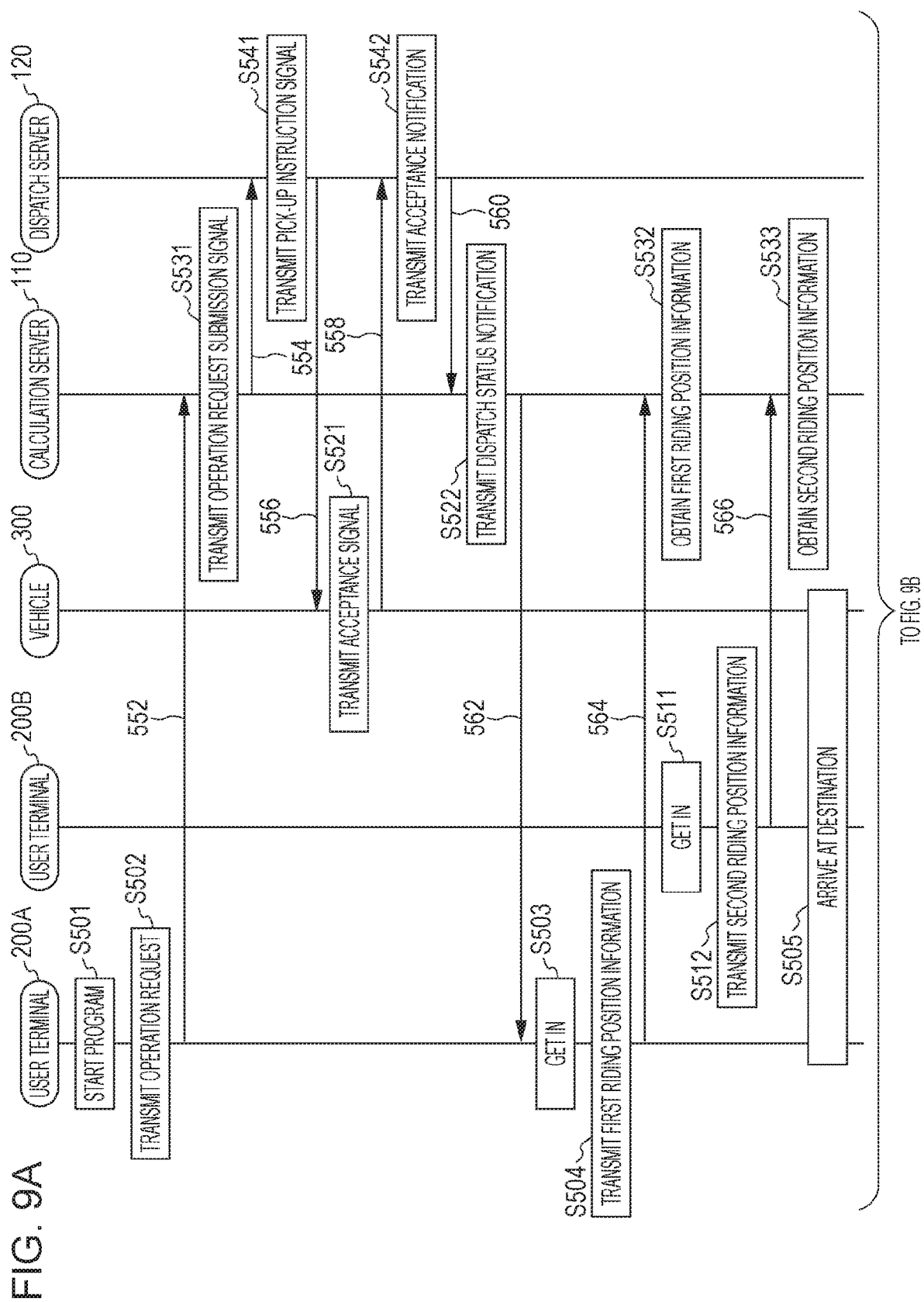

Register necessary information

Family name        Taniguchi

Given name         Tomohiko

TEL                090-1234-5678

LINE User Policy    LINE TAXI User Policy

Accept User Policy and register information

FIG. 16
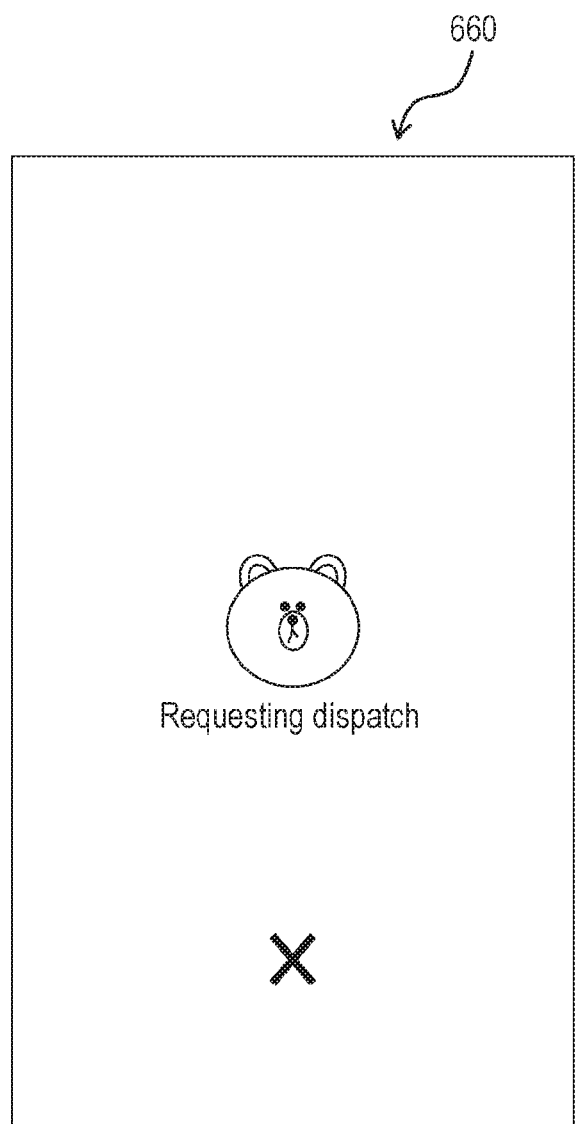
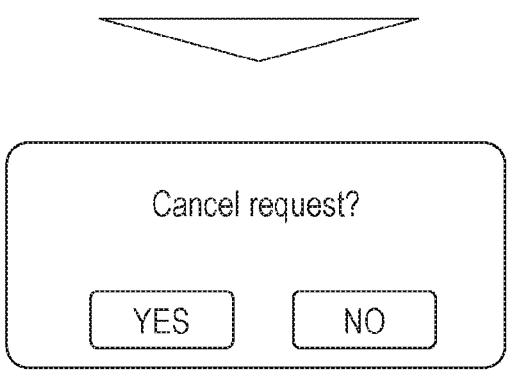

FIG. 17
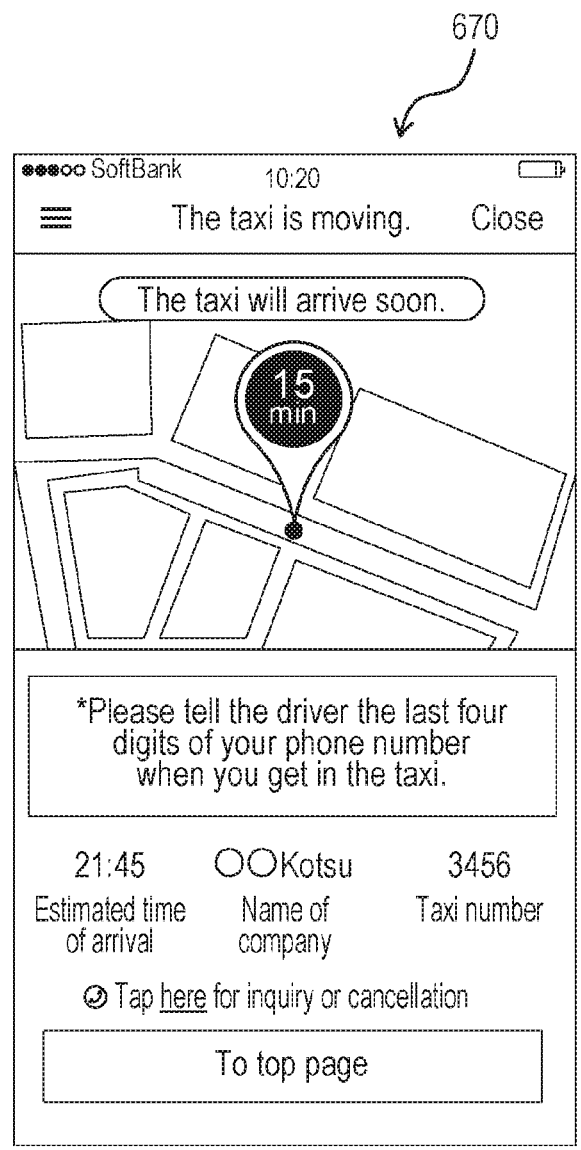
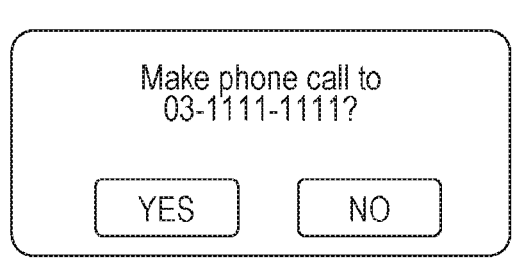

INFORMATION PROCESSING METHOD AND NON-TRANSITORY COMPUTER-READABLE STORAGE MEDIUM

CROSS-REFERENCE TO RELATED APPLICATIONS

This is a continuation of U.S. non-provisional application Ser. No. 14/839,423, filed Aug. 28, 2015, which claims the benefit of priority under 35 U.S.C § 119 to Japanese Patent Application No. 2015-037375 filed on Feb. 26, 2015, in the Japanese Patent Office (JPO), the disclosure of both of which are incorporated herein in their entirety by reference.

BACKGROUND

1. Field

Various example embodiments of the inventive concepts relate to payment techniques for a plurality of users who have shared a ride in a paid vehicle, such as a taxi, hired car, boat, helicopter, private plane, etc. Specifically, some example embodiments relate to techniques of calculating the percentages of fare to be paid by individual users who have shared a ride in a paid vehicle in a case where the distances traveled by the individual users are different.

2. Description of the Related Art

Hitherto, transportation using paid vehicles, such as taxis and hired cars, has been utilized as a way of traveling. Transportation using paid vehicles is very convenient because it can provide services according to needs of individual users, but the fares thereof are higher than those of public transportation such as trains and buses.

In the case of utilizing a paid vehicle such as a taxi or hired car, the fare per user can be reduced as the number of users who share a ride in the paid vehicle increases. In particular, in a case where a plurality of users travel to the same destination, there is a high demand for sharing a ride in the paid vehicle.

Regarding a method for sharing a ride in a paid vehicle described above, the following technique has been developed in which the fares to be paid by individual users are calculated in accordance with riding positions and destinations of the individual users that have been reported by the individual users to a taxi driver or a taxi dispatch center. The riding positions and destinations of the individual users are informed by the individual users to the taxi driver or the taxi dispatch center orally or through the input of characters.

However, several issues exists with this technique. For example, each user has to set a destination in advance and input it by characters in order to inform the taxi driver or the taxi dispatch center of the riding position and destination through input of characters. In the case where each user orally informs the taxi driver of the riding position and destination, the taxi driver needs to inform the taxi dispatch center of the riding positions and destinations of the individual users, which may increase the burden on the taxi driver and result in mistakes made for various reasons, including because the taxi driver forgot to report the information to the taxi dispatch center, there was a misunderstanding and/or miscommunication between the passengers and the taxi driver and/or the taxi dispatch center, or the like. Further, even in the case where the distance traveled by a shared ride is longer than necessary compared to the distance traveled without a shared ride, the percentage of fare to be paid by each user is determined simply in accordance with the distance traveled by the user, and thus the fare is not fairly divided.

SUMMARY

Accordingly, some example embodiments provide server devices that calculate a shared-ride section without increasing the burden on users and a driver of a paid vehicle and that calculate the percentages of fare to be paid by the individual users who have shared a ride in accordance with the distances traveled by the individual users, and also provide communication terminals that communicate with the server devices.

A server device according to at least one example embodiment may include a memory having computer readable instructions stored thereon, and at least one processor configured to execute the computer readable instructions to obtain operation identification information for identifying an operation of a vehicle and user identification information for identifying a plurality of users who utilize the operation, specify, in accordance with distances between the vehicle and communication terminals of the plurality of users, riding position information and drop off position information on individuals of the plurality of users, store the operation identification information, the user identification information, the riding position information, and the drop off position information in association with one another, calculate, in accordance with the riding position information and the drop off position information on individuals of the plurality of users, percentages of an operation fare for the operation to be paid by individuals of the plurality of users, and calculate, in accordance with the percentages and the operation fare for the operation, amounts to be paid by individuals of the plurality of users.

According to at least one example embodiment, the at least one processor may be further configured to calculate the percentages in accordance with distances that would be traveled by individuals of the plurality of users if each of the plurality of users independently utilizes the vehicle from a position represented by the riding position information to a position represented by the drop off position information.

According to at least one example embodiment, the at least one processor may be further configured calculate the percentages in accordance with distances that have actually been traveled by individuals of the plurality of users utilizing the vehicle or periods of time that have actually been spent traveling the distances.

According to at least one example embodiment, the at least one processor may be further configured to specify the riding position information and the drop off position information through near field wireless communication between the vehicle and the communication terminals.

According to at least one example embodiment, the at least one processor may be further configured to notify the communication terminals of the amounts.

A communication terminal according to at least one example embodiment may include a memory having computer readable instructions stored thereon, and at least one processor configured to execute the computer readable instructions to receive operation identification information for identifying an operation of a vehicle that is operated in response to an operation request, specify, in accordance with a distance between the vehicle and a communication terminal of a user who rides the vehicle, riding position information and drop off position information on the user, and receive information representing an amount to be paid by the user, the amount being calculated in accordance with the riding position information, the drop off position information, and an operation fare for the operation.

According to at least one example embodiment, the at least one processor may be further configured to specify the riding position information and the drop off position information through near field wireless communication between the vehicle and the communication terminal of the user.

According to at least one example embodiment, the at least one processor may be further configured to receive operation fare information including information representing the operation fare from the vehicle, and transmit the received operation fare information to a server device.

According to at least one example embodiment, a non-transitory computer readable medium may be provided that has stored thereon a computer program for causing a computer to operate as the communication terminal.

According to a server device, a communication terminal, and/or a non-transitory computer readable medium for the communication terminal according to some example embodiments, it is possible to provide a server device that calculates a shared-ride section without increasing the burden on users and a driver of a paid vehicle and that calculates the percentages of fare to be paid by the individual users who have shared a ride in accordance with the distances traveled by the individual users, and a communication terminal that communicates with the server device.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIGS. 9A and 9B are diagrams illustrating an operation flow of a shared-ride fare calculation system according to at least one example embodiment.

FIG. 12 is a diagram illustrating an example of an interface for user registration in an operation flow of a shared-ride fare calculation system according to at least one example embodiment.

FIG. 16 is a diagram illustrating an example of a screen that is displayed after an operation request signal has been transmitted in an operation flow of a shared-ride fare calculation system according to at least one example embodiment.

FIG. 17 is a diagram illustrating an example of a screen that is displayed when a vehicle is approaching for pick-up in an operation flow of a shared-ride fare calculation system according to at least one example embodiment.

DETAILED DESCRIPTION

Figure 1:
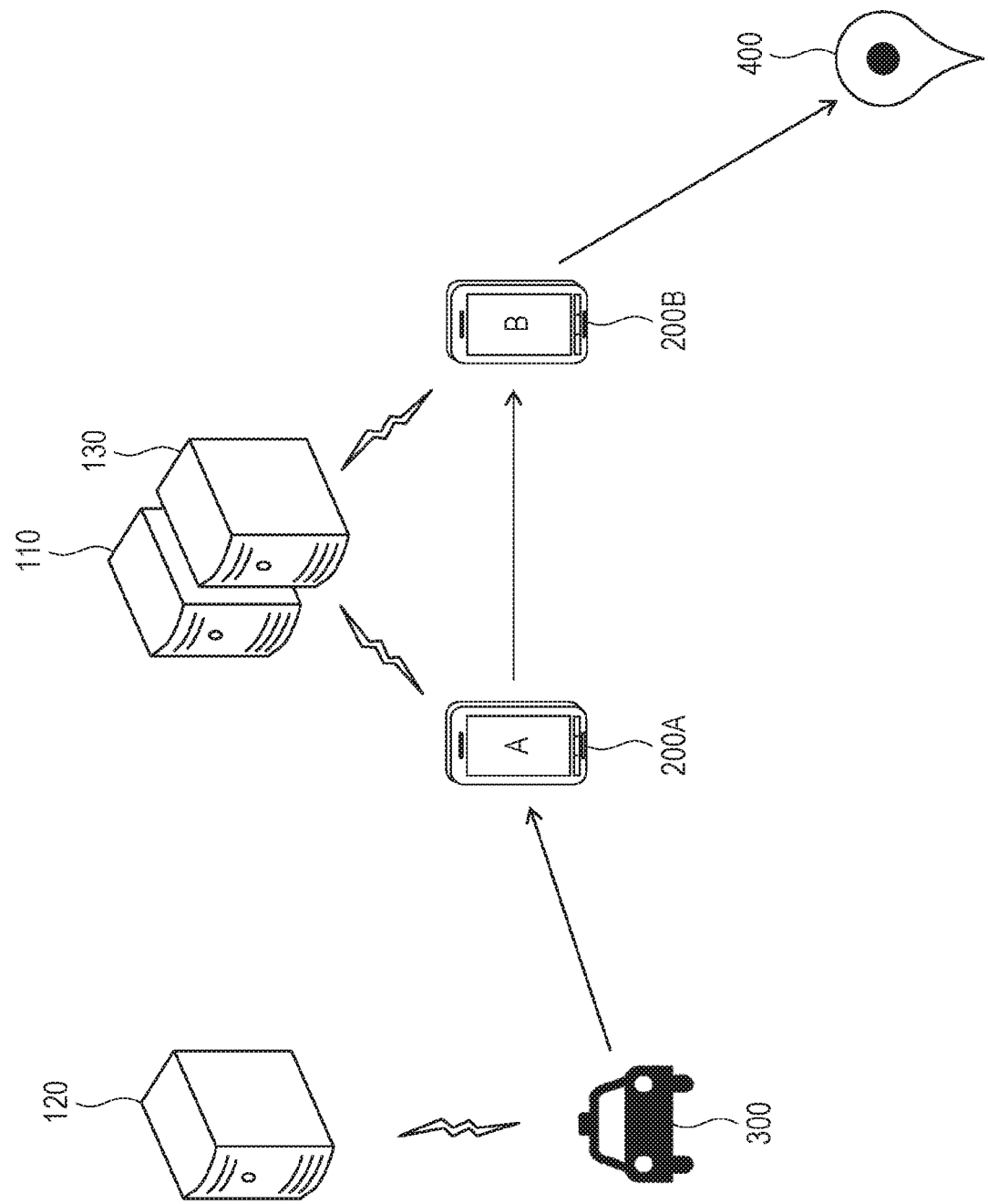
FIG. 1 is a diagram illustrating an overview of a shared-ride fare calculation system according to at least one example embodiment.

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, calculation servers (e.g., server devices), communication terminals, and/or a software programs for the communication terminals according to some example embodiment will be described with reference to the drawings. Note that the calculation server, the communication terminal, and the program for the communication terminal may be implemented by various example embodiments and are not limited by the description of the example embodiments given below.

In the following description, a user utilizes a paid vehicle, such as a taxi, hired car, boat, helicopter, private plane, etc. However, the user carries a communication terminal of the user (user terminal) while moving around, and thus the user and the user terminal are not clearly distinguished from each other. For example, in a case where the user utilizes a paid vehicle, an expression "a user terminal utilizes a paid vehicle" may be used because the user carries the user terminal. This expression has the same meaning as "a user carrying a user terminal utilizes a paid vehicle". Likewise, utilization of a vehicle dispatch service by a user may be expressed by utilization of a vehicle dispatch service by a user terminal.

In the example embodiments of the inventive concepts, a description will be given of an example of a shared-ride fare calculation system using a vehicle the fare of which changes depending on a distance traveled and/or a period of time spent on a ride, such as a taxi or hired car, but the embodiments are not limited thereto. For example, at least one example embodiment is applicable to other transportation such as boats/ships, airplanes, helicopters, etc.

A shared-ride fare calculation system and a shared-ride fare calculation system including a program for calculating a shared-ride fare according to at least one example embodiment will be described in detail with reference to FIGS. 1 to 20.

Figure 2:
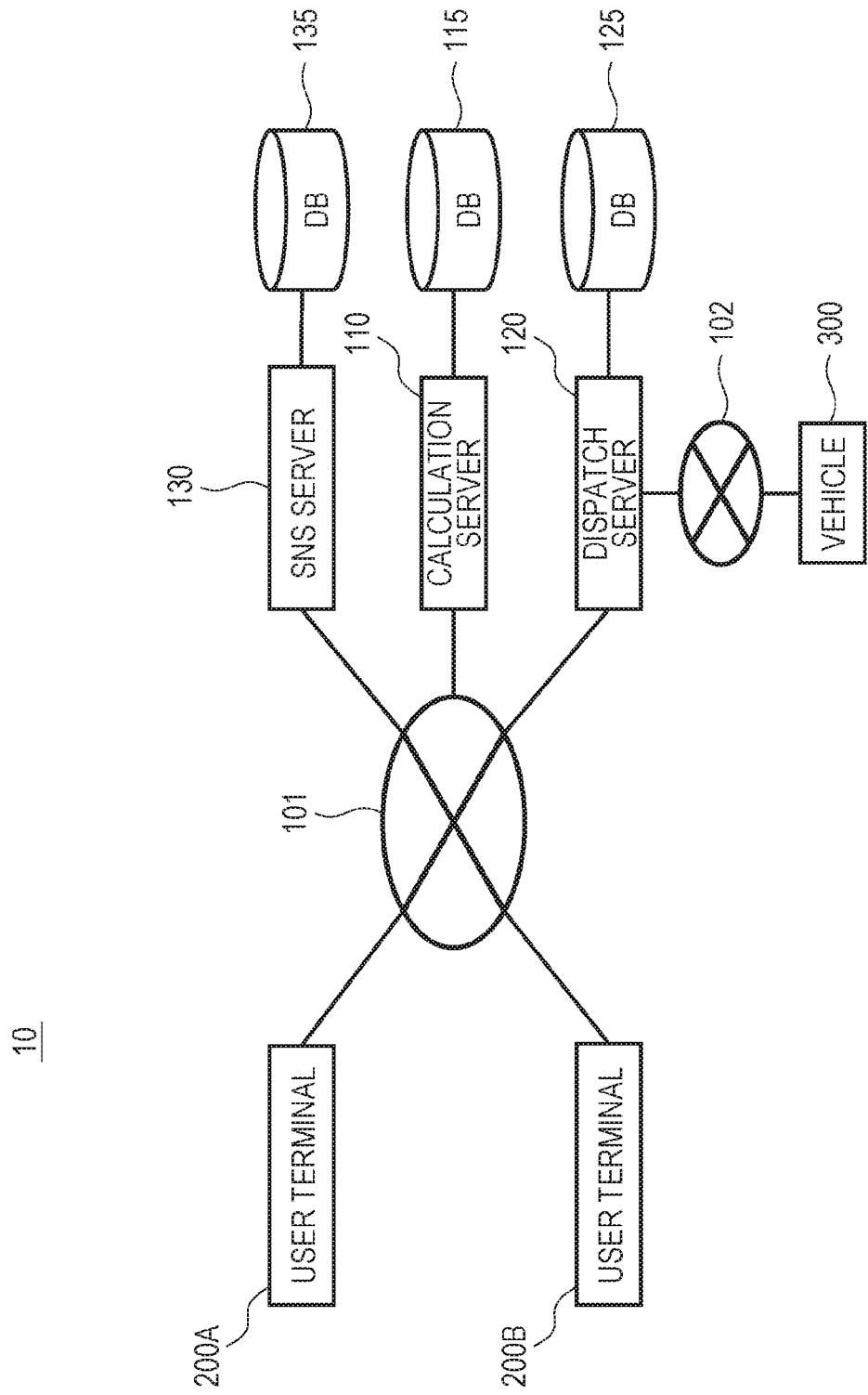
FIG. 2 is a block diagram illustrating an overview of a shared-ride fare calculation system according to at least one example embodiment.

FIG. 1 is a diagram illustrating an overview of a shared-ride fare calculation system according to at least one example embodiment. FIG. 2 is a block diagram illustrating an overview of a shared-ride fare calculation system according to at least one example embodiment. As illustrated in FIGS. 1 and 2, a shared-ride fare calculation system 10 according to at least one example embodiment includes a calculation server 110, a dispatch server 120, and a social networking service (SNS) server 130 (hereinafter simply referred to as an "SNS server 130"). As illustrated in FIG. 1, the calculation server 110 and the SNS server 130 communicate with a plurality of user terminals 200A and 200B, and the dispatch server 120 communicates with a vehicle 300. Here, the vehicle 300 is a vehicle that has received an operation request from the user terminal 200A. The vehicle 300 first picks up the user terminal 200A and then picks up the user terminal 200B and travels toward a destination with the user terminals 200A and 200B sharing a ride.

Hereinafter, the user terminals 200A and 200B are simply referred to as user terminals 200 when not explicitly distinguished from each other. The plurality of user terminals 200 may be at least communication terminals connectable to a first network 101 illustrated in FIG. 2. The individual user terminals 200 may have different functions. Examples of the user terminals 200 include mobile phones, smartphones, tablet personal computers (PCs), personal digital assistants (PDAs), personal computers (PCs), laptop computers, personal handy-phone systems (PHSs), portable gaming consoles, etc.

The calculation server 110 is a server that calculates the percentages and amounts of an operation fare to be paid by the individual user terminals 200 that have shared a ride in the vehicle 300. The calculation server 110 may also be implemented as a plurality of interconnected servers that distribute processing and/or network traffic load to provide more efficient processing, greater network up-time, and greater responsiveness to network requests. Here, the calculation server 110 obtains operation identification information for identifying an operation of the vehicle 300 and user identification information for identifying a plurality of users who utilize the operation; specifies, on the basis of distances between the vehicle 300 and the user terminals 200, which are communication terminals of the plurality of users, riding position information and drop off position information on the individual users; stores the operation identification information, the user identification information, the riding position information, and the drop off position information in association with one another; calculates, on the basis of the riding position information and the drop off position information on the individual users, percentages of an operation fare for the operation to be paid by the individual users; and calculates, on the basis of the percentages and the operation fare for the operation, amounts to be paid by the individual users.

The operation identification information is identification information that is assigned to each of a plurality of vehicles 300 for each service. Specific examples of the operation identification information include an order sheet that is issued for a service and an operation log for a service. The user identification information is, for example, identification information for identifying the user terminal 200A and the user terminal 200B. Specific examples of the user identification information include device-specific information held by each user terminal 200 and a user identifier (ID) that is managed by the SNS server 130 and is used in a service specific to each of the user terminals 200A and 200B.

The dispatch server 120 is a server installed in a dispatch center, or other location, that provides a pick-up instruction to the vehicle 300 in response to an operation request, and manages position information and operation information on the vehicle 300. Here, the operation information includes the above-described operation identification information and operation fare information. The operation information may also include user identification information. The dispatch server 120 may manage the operation information in an analog manner or digital manner. Analog management is a management method in which the driver of the vehicle 300 takes order sheets created for individual operations of the vehicle 300 and receipts of operation fares recorded on a fare meter to the dispatch center (the operation fare may include driver tip amount, tax amount, fee amount, etc., as well), and a staff of the dispatch center stores the order sheets and receipts in a database of the dispatch server 120. On the other hand, digital management is a management method in which operation identification information on the vehicle 300 corresponding to order sheets and/or operation fare information corresponding to receipts is transmitted from the vehicle 300 to the dispatch server 120 through wireless communication and the information is stored in the database. The dispatch server 120 may also be implemented as a plurality of interconnected servers that distribute processing and/or network traffic load to provide more efficient processing, greater network up-time, and greater responsiveness to network requests.

The SNS server 130 is a server that provides an SNS service to the user terminals 200 and manages personal information on users who subscribe to the SNS service and have the user terminals 200 (device-specific information on a user terminal, name, phone number, credit card information, email address, residential address, age, sex, user ID, photo, and so forth). The SNS server 130 may also be implemented as a plurality of interconnected servers that distribute processing and/or network traffic load to provide more efficient processing, greater network up-time, and greater responsiveness to network requests.

While the calculation server 110, dispatch server 120, and SNS server 130 are depicted as separate servers in FIG. 1, according to some example embodiments, the functions of two or more of these servers may be integrated into one or more servers.

Here, the plurality of user terminals 200 and/or the vehicle 300 has a position specifying unit. As the position specifying unit, a global positioning system (GPS), assisted GPS (A-GPS), GLONASS, mobile phone base station and/or Wi-Fi access point triangulation, dead-reckoning, etc., may be used, for example. In the shared-ride fare calculation system 10, position information on the plurality of user terminals 200 is transmitted to the calculation server 110, whereas position information on the vehicle 300 is transmitted to the dispatch server 120. Position information on a destination 400 is information that is input by any one of the plurality of user terminals 200. The position information on the destination 400 is transmitted from the user terminal 200 that has input the position information to the calculation server 110. Another example of the position specifying unit may be near field wireless communication, or other wireless communication types, in addition to the GPS. The details of the near field wireless communication will be described below.

In at least one example embodiment, a description is given of a configuration in which the calculation server 110, the dispatch server 120, and the SNS server 130 are separated from one another, but the configuration is not limited thereto. For example, the calculation server 110 may have a function of the dispatch server 120 and/or the SNS server 130. That is, the function of the calculation server 110, the function of the dispatch server 120, and the function of the SNS server 130 may be implemented by a single server.

The individual users of the plurality of user terminals 200 may be users who are called "follow" or "friend" and have a relationship of contacting each other in the SNS service managed by the SNS server 130. In other words, the plurality of user terminals 200 have established a relationship in which at least a user is able to contact another user in a certain service in which the plurality of user terminals 200 are registered. Here, a description is given of a configuration in which the plurality of user terminals 200 have a relationship of contacting one another, but the configuration is not limited thereto. That is, the plurality of user terminals 200 do not necessarily have the above-described relationship. In that case, the SNS server 130 may be omitted in FIG. 1 and/or not accessed during operation.

The individual users of the plurality of user terminals 200 may be users having a relationship of "friend" in the SNS service managed by the SNS server 130. In other words, the plurality of user terminals 200 have established a relationship in which the users are approved by one another in a certain service in which the plurality of user terminals 200 are registered, such as a social media service, instant messaging service, chat service, videochat service, phone service, VoIP service, email service, online gaming service, shared-ride service, etc. The relationship in which the users are approved by one another is a relationship in which the existence of one another is recognized, and also is a relationship that has been established by transmitting a request for establishing a relationship of friend from a user and accepting the request by the other user. Here, a description is given of a configuration in which the plurality of user terminals 200 have established a relationship in which the plurality of user terminals 200 are approved by one another, but the configuration is not limited thereto. That is, in the shared-ride fare calculation system 10, the plurality of user terminals 200 do not necessarily have the above-described relationship. In that case, the SNS server 130 may be omitted in FIG. 1.

As illustrated in FIG. 2, the calculation server 110, the dispatch server 120, the SNS server 130, and the plurality of user terminals 200 are connected to one another via the first network 101. The dispatch server 120 and the vehicle 300 are connected to each other via a second network 102. The calculation server 110, the dispatch server 120, and the SNS server 130 include databases (DBs) 115, 125, and 135, respectively. A typical IP network may be used as the first network 101. An in-vehicle wireless network, a local network, and/or direct wireless communication (e.g., IR communications, etc.) may be used as the second network 102.

The DB 115 of the calculation server 110 stores operation identification information, user identification information, and riding position information and drop off position information on a plurality of users. The operation identification information, user identification information, riding position information and drop off position information on a plurality of users stored in the DB 115 are associated with one another. The DB 115 may also store additional information, such as seat position, seat type, ride type (e.g., premium rides, priority rides, express rides, special request rides), etc.

FIG. 2 illustrates a configuration in which the dispatch server 120 and the vehicle 300 are connected to each other via the second network 102, but the configuration is not limited thereto. For example, the vehicle 300 may be connected to the dispatch server 120 via the first network 101. Also, FIG. 2 illustrates a configuration in which the calculation server 110, the dispatch server 120, and the SNS server 130 are directly connected to the DBs 115, 125, and 135, respectively, but the configuration is not limited thereto.

For example, the DBs 115, 125, and 135 may be connected to the first network 101. That is, cloud computing for storing data via a network may be used instead of the DBs 115, 125, and 135.

The DB 115 connected to the calculation server 110 or the DB 135 connected to the SNS server 130 stores personal information on users who have the user terminals 200 (e.g., device-specific information, name, phone number, credit card information, email address, residential address, age, sex, user ID, user photos, driver photos, vehicle information, and so forth), assessment information on users who have the user terminals 200 and the vehicle 300, road map information, traffic jam information, and so forth. The individual items included in the personal information on the users of the user terminals 200 are stored in association with one another.

The DB 125 connected to the dispatch server 120 stores a vehicle type, vehicle number, driver information (e.g., name, mobile phone number, age, sex, driver photo, vehicle license information, vehicle insurance information, qualification information, etc.), service status such as vacant, out of service, pick up, and in service, and position information on the vehicle 300.

The DB 135 connected to the SNS server 130 stores a user ID of a user who utilizes the SNS service provided by the SNS server 130, device-specific information on the user terminal held by the user, a list of other users having a relationship of contacting the user (friend list), and so forth. In a case where the SNS server 130 has a payment system in the SNS service, the DB 135 may further store information registered in the payment system, such as credit card information, bank account information, wire account information, digital currency information (e.g., crypto-currency), etc.

Hardware Configuration of Calculation Server

Figure 3:
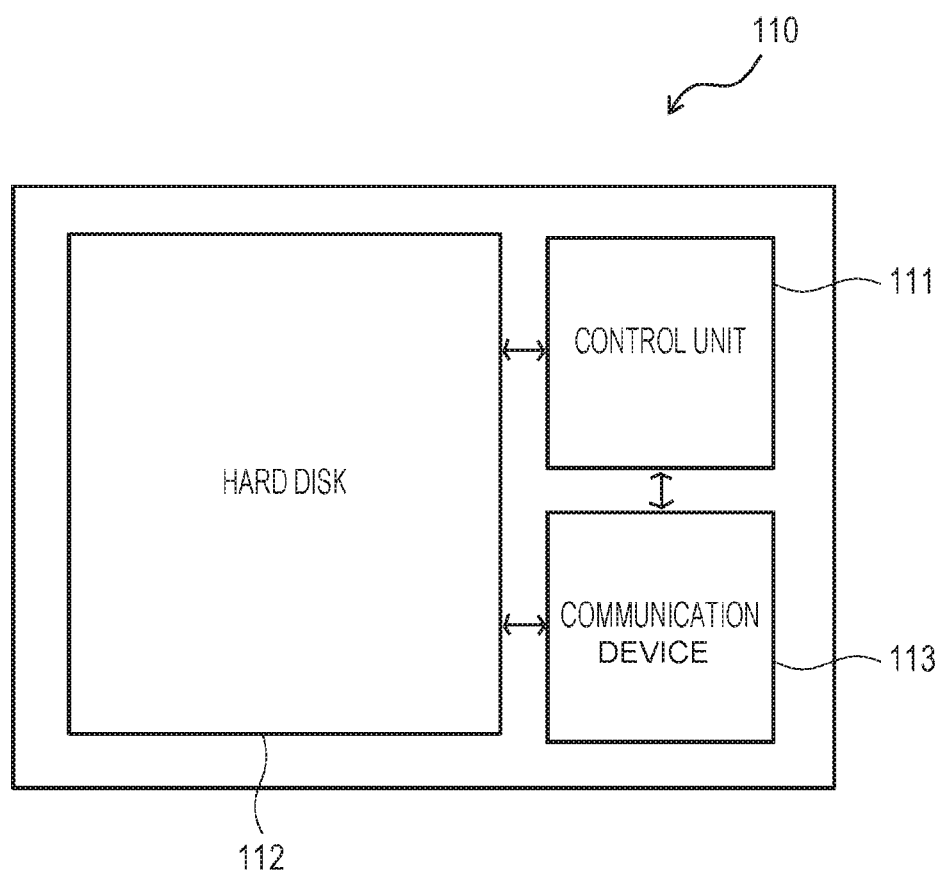
FIG. 3 is a block diagram illustrating the hardware configuration of calculation server that is used in a shared-ride fare calculation system according to at least one example embodiment.

FIG. 3 is a block diagram illustrating the hardware configuration of a calculation server that is used in a shared-ride fare calculation system according to at least one example embodiment. According to FIG. 3, the calculation server 110 includes a control unit 111, a hard disk 112, and a communication device 113.

The control unit 111 includes at least one central processing unit (CPU) and at least one storage device such as registers, memory, SSD, hard disk, etc. The control unit 111 executes, with the CPU, a program (e.g., computer readable instructions) and data stored in the memory and/or the hard disk 112, and performs arithmetic processing in accordance with the program and/or executes the computer readable instructions, thereby transforming the control unit 111/CPU into a special purpose processor.

The hard disk 112 is a storage device capable of storing a large amount of data. The hard disk 112 stores a program that is used for arithmetic processing or the like, and temporarily stores information transmitted from the user terminal 200. The hard disk may also be a solid-state drive, a non-volatile memory device, etc.

The communication device 113 controls transmission of data to and reception of data over various communications networks, such as the Internet, intranets, a WAN, a LAN, a PAN, a radio data network, a wireless network, a wireless phone network, etc., including from the dispatch server 120, the SNS server 130, and the user terminal 200 via the first network 101.

The storage device of the control unit 111 reads a program that is used for arithmetic processing from the hard disk 112 when it is necessary, and stores the program therein.

Hardware Configuration of User Terminal

Figure 4:
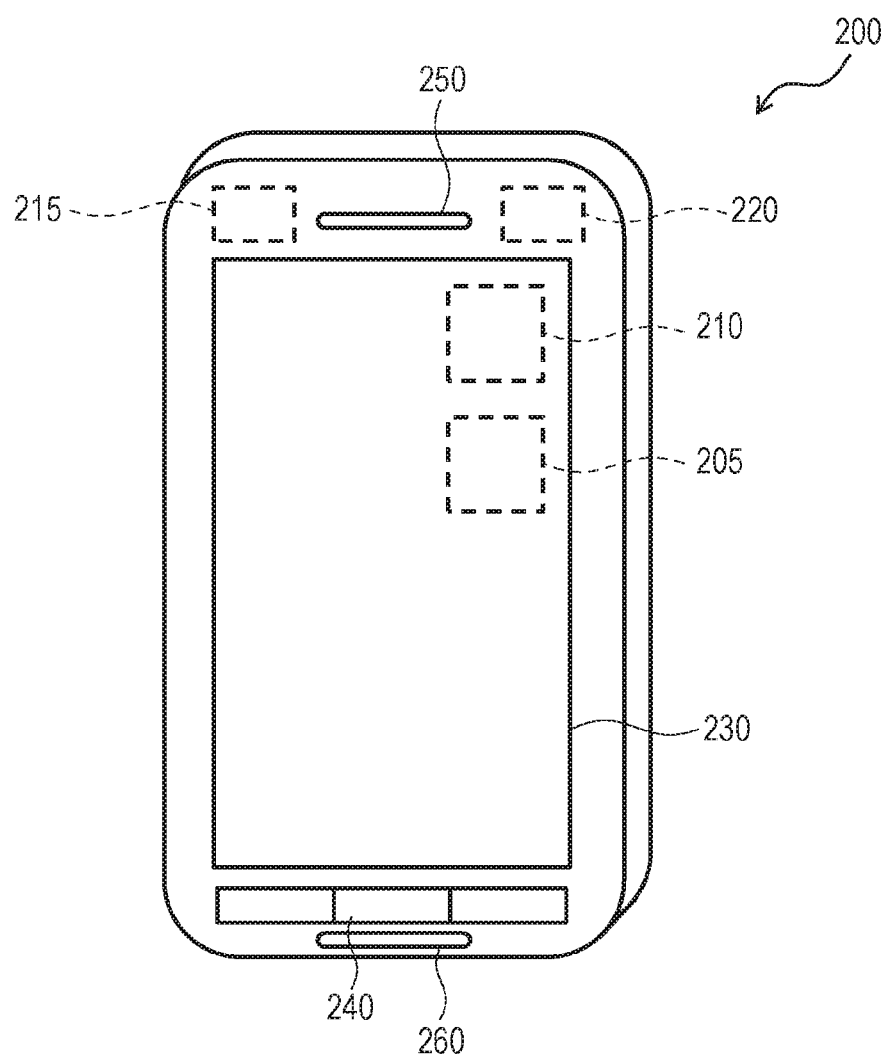
FIG. 4 is a schematic diagram illustrating the hardware configuration of a communication terminal that is used in a shared-ride fare calculation system according at least one example embodiment.

FIG. 4 is a schematic diagram illustrating the hardware configuration of a communication terminal that is used in a shared-ride fare calculation system according to at least one example embodiment. According to FIG. 4, the user terminal 200, which is a communication terminal used in the shared-ride fare calculation system 10, includes a memory 205, a control unit 210, a near field wireless communication device 215, and a communication module 220. Also, a display 230, an operation button 240, a speaker 250, and a microphone 260 are provided on one side of the user terminal 200. The display 230 may include a touch sensor, and the operation button 240 is not necessarily provided. In a case where the user terminal 200 does not have a phone call function, the speaker 250 and the microphone 260 are not necessarily provided.

The memory 205 stores a program (e.g., computer readable instructions) that causes the user terminal 200 to implement a specific function, information specific to the user terminal 200, and personal information on the user who has the user terminal 200.

The control unit 210 includes at least one processing device such as a CPU and at least one storage device such as a register, non-volatile memory, hard disk, SSD, etc. The control unit 210 executes, with the CPU, a program (e.g., computer readable instructions) and data stored in the memory 205, and implements various functions of the user terminal 200 in accordance with the program, thereby transforming the control unit 210/CPU into a special purpose processor.

The near field wireless communication device 215 is a functional unit that performs near field wireless communication using radio waves of radio frequencies ranging from the megahertz band to the gigahertz band, and is capable of performing communication in a range of several meters to several tens of meters. Near field wireless communication is communication in which radio waves emitted from a radio wave source are received, and information specific to a communication device and various information including a distance between the radio wave source and the communication device are transmitted. Examples of near field wireless communication include a beacon, radio frequency identifier (RFID), Bluetooth, Bluetooth Low Energy (BLE), near field communication (NFC), etc. The near field wireless communication device 215 includes an antenna that receives radio waves emitted from a radio wave source and a logic circuit that analyzes the received radio waves in the above-described near field wireless communication. Also, the near field wireless communication device 215 may include a logic circuit that modulates radio waves emitted from the radio wave source in order to transmit information specific to the user terminal 200.

The communication module 220 includes an antenna for wirelessly transmitting and receiving signals, a radio-frequency circuit, a modulation circuit, and so forth. The communication module 220 connects to a network and accesses the calculation server 110 under control performed by the control unit 210.

The display 230 may be constituted by a liquid crystal display, an organic electroluminescence (EL) display, or the like. As the touch sensor, a resistive sensor, a capacitive sensor, an optical sensor, or the like may be used. The user operates the user terminal 200 in accordance with the content displayed on the display 230 to implement various functions. Additionally, the user may use a user input device (not shown) to interact with the user terminal 200, such as a keyboard, mouse, stylus, voice commands, gesture commands, etc., as well.

Hardware Configuration of Vehicle

Figure 5:
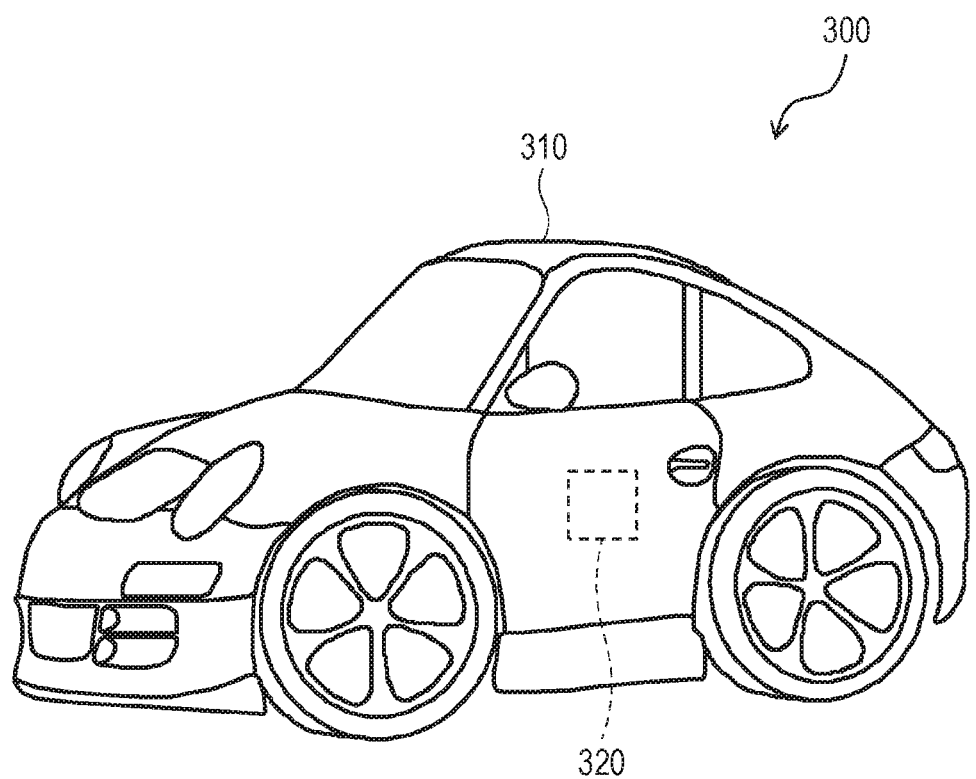
FIG. 5 is a schematic diagram illustrating the hardware configuration of a vehicle that is used in a shared-ride fare calculation system according to at least one example embodiment.

FIG. 5 is a schematic diagram illustrating the hardware configuration of a vehicle that is used in a shared-ride fare calculation system according to at least one example embodiment. According to FIG. 5, the vehicle 300 includes a near field wireless communication device 320 that is provided in a vehicle body 310. The near field wireless communication device 320 includes a radio wave source that emits radio waves to be used for near field wireless communication. Also, the near field wireless communication device 320 may include a receiving unit that receives radio waves that have been modulated by the near field wireless communication device 215 of the user terminal 200, and an analyzing unit that analyzes information specific to the user terminal 200 by using the modulated radio waves.

Functional Configuration of Calculation Server

Figure 6:
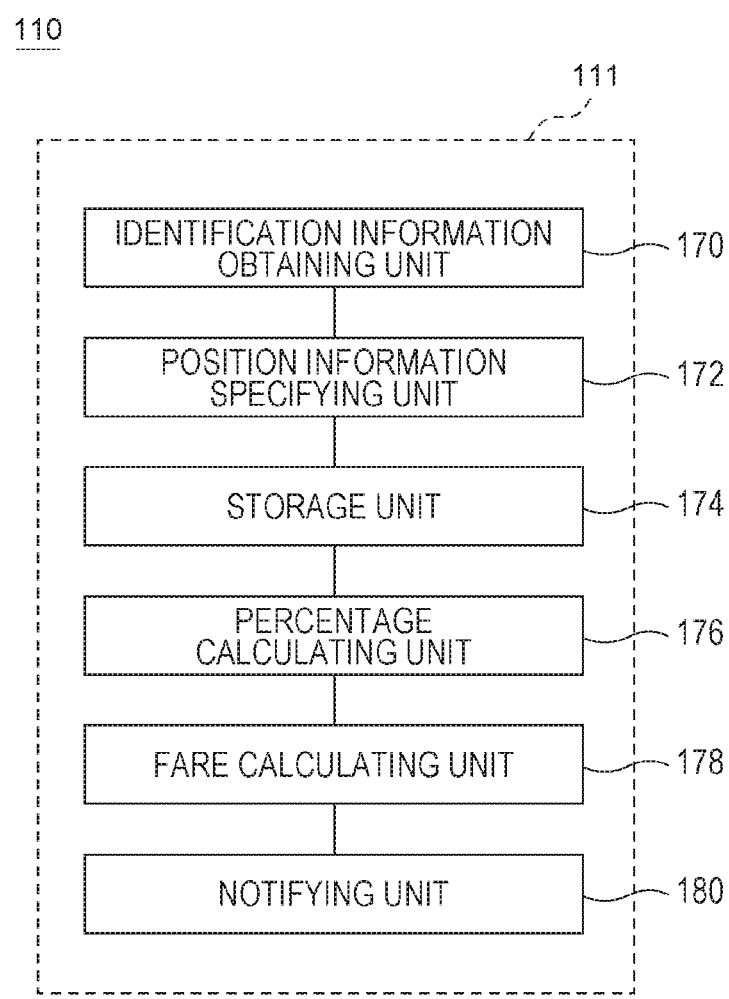
FIG. 6 is a block diagram illustrating the functional configuration of a calculation server that is used in a shared-ride fare calculation system according to at least one example embodiment.

FIG. 6 is a block diagram illustrating the functional configuration of a calculation server that is used in a shared-ride fare calculation system according to at least one example embodiment. With reference to FIG. 6, individual functional blocks of the calculation server 110, as implemented by the control unit 111, illustrated in FIG. 2 will be described in more detail. According to FIG. 6, the calculation server 110 includes an identification information obtaining unit 170, a position information specifying unit 172, a storage unit 174, a percentage calculating unit 176, a fare calculating unit 178, and a notifying unit 180.

The identification information obtaining unit 170 obtains operation identification information and operation fare information from the dispatch server 120. As described above, the operation identification information is information for identifying an operation of the vehicle 300, and may be information transmitted from the vehicle 300 through wireless communication or information based on an order sheet stored by an operator, or may be a combination thereof. The identification information obtaining unit 170 obtains user identification information from the user terminals 200. The user identification information is information for identifying a plurality of users who utilizes an operation of the vehicle 300. In the case of FIG. 6, the identification information obtaining unit 170 obtains, as user identification information, user IDs from the user terminals 200. The identification information obtaining unit 170 may obtain, as user identification information, user IDs in the SNS service managed by the SNS server 130, by communicating with the SNS server 130.

The position information specifying unit 172 specifies riding position information (e.g., rides start information, or pick-up position information) and drop off position information on the individual user terminals 200 on the basis of the distances between the vehicle 300 and the individual user terminals 200. The riding position information and drop off position information may be specified through near field wireless communication between the vehicle 300 and the user terminals 200, or may be specified on the basis of information obtained by a GPS. The riding position information and drop off information may be expressed as latitude/longitude coordinate information, street address information, point-of-interest (POI) information, or the like.

The storage unit 174 stores operation identification information, user identification information, riding position information, and drop off position information in association with one another. These pieces of information are read from the DB 115 connected to the calculation server 110 and temporarily stored in the hard disk 112 of the calculation server 110. However, the pieces of information are not necessarily stored in the hard disk 112. That is, the pieces of information may be stored in association with one another in the DB 115 connected to the calculation server 110, and the calculation server 110 may perform calculation by referring to the pieces of information stored in the DB 115.

The percentage calculating unit 176 calculates the percentages of a fare for the operation of the vehicle 300 to be paid by the individual users of the plurality of user terminals 200 on the basis of the riding position information and drop off position information on the individual user terminals 200. A specific calculation method for the percentage calculating unit 176 will be described below.

The fare calculating unit 178 calculates the amounts to be paid by the individual user terminals 200 on the basis of the percentages calculated by the percentage calculating unit 176 and the operation fare for the operation of the vehicle 300. The operation fare may include driver tip amount, tax amount, fee amount, etc., as well.

The notifying unit 180 notifies the user terminals 200 that have shared a ride of the amounts calculated by the fare calculating unit 178. The notifying unit 180 may also notify the user terminals 200 of, in addition to the calculated amounts, information such as the date and time of the operation, information on the users who have sheared a ride (name, phone number, residential address, and so forth), and riding/drop off positions, operation routes, and payment statuses of the individual users. In a case where the notifying unit 180 notifies a user of map information representing an operation route or the like, the map information may be displayed by using WebView in which each piece of position information is displayed on the corresponding user terminal 200. The calculation result and the data transmitted to the user terminals 200 are stored in the DB 115. In a case where the user terminals 200 are notified of the above-described information by another server or another system, the calculation server 110 does not need to include the notifying unit 180.

Although not illustrated, the calculation server 110 may include a dispatch management unit in addition to the above-described identification information obtaining unit 170, position information specifying unit 172, storage unit 174, percentage calculating unit 176, fare calculating unit 178, and notifying unit 180.

In a case where the user terminal 200 transmits an operation request in the shared-ride fare calculation system 10, the above-mentioned dispatch management unit submits the operation request to the dispatch server 120. The dispatch management unit may have a delay function so as to submit the operation request to the dispatch server 120 after a certain period of time has elapsed since transmission of the operation request from the user terminal 200. Also, the dispatch management unit is capable of receiving cancellation of the operation request from the user terminal 200 during the delay period. On the other hand, if the operation request is not canceled during the delay period, the dispatch management unit submits the operation request to the dispatch server 120.

Further, the dispatch management unit may notify the user terminal 200 of position information on the user terminal 200 while the vehicle 300 is traveling to pick up the user, position information on the vehicle 300, position information on a destination, traffic jam information, estimated time of arrival information, etc. Also, the dispatch management unit may provide the user terminal 200 with a way of making an inquiry (phone call or message) of the vehicle 300 while the vehicle 300 is traveling to pick up the user. Also, the dispatch management unit may provide the user terminal 200 that has utilized the vehicle 300 with a way of assessing the utilized vehicle 300. Also, the dispatch management unit may provide the vehicle 300 utilized by the user terminal 200 with a way of assessing the user terminal 200. The assessment results are stored in the DB 115. On the basis of the assessment results, the priority of the vehicle 300 utilized by the user terminal 200 or the priority of the user terminal 200 to be provided with a service of the shared-ride fare calculation system 10 may be changed.

Functional Configuration of Communication Terminal Making Operation Request

Figure 7:
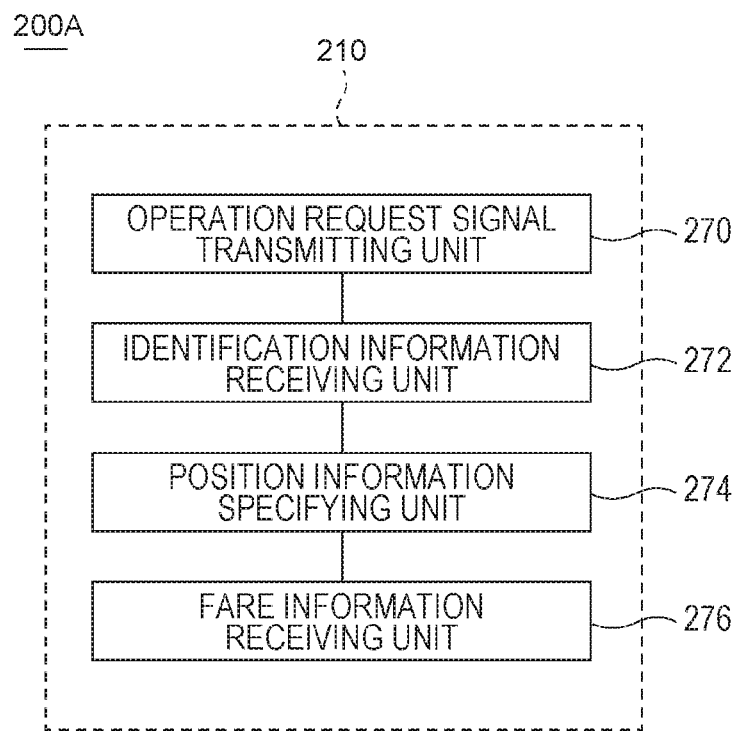
FIG. 7 is a block diagram illustrating the functional configuration of a communication terminal that is used in a shared-ride fare calculation system according to at least one example embodiment.

FIG. 7 is a block diagram illustrating the functional configuration of a communication terminal that is used in a shared-ride fare calculation system according to at least one example embodiment. With reference to FIG. 7, individual functional blocks of the user terminal 200A of user A who makes an operation request among the user terminals 200 illustrated in FIG. 2 will be described in more detail. According to FIG. 7, the user terminal 200A, as implemented by control unit 210, that makes an operation request includes an operation request signal transmitting unit 270, an identification information receiving unit 272, a position information specifying unit 274, and a fare information receiving unit 276.

The operation request signal transmitting unit 270 transmits an operation request signal for requesting an operation of the vehicle 300 to the dispatch server 120. The identification information receiving unit 272 receives, from the dispatch server 120, operation identification information for identifying an operation of the vehicle 300 operated in response to the operation request transmitted by the operation request signal transmitting unit 270. As described above, the operation identification information may be an operation log for each service transmitted from the vehicle 300 to the dispatch server 120 through wireless communication, or may be information representing an order sheet stored in the dispatch server 120 or the DB 125 by an operator, or may be a combination thereof.

The position information specifying unit 274 specifies, on the basis of the distance between the vehicle 300 and the user terminal 200 that utilizes the vehicle 300 operated in response to the operation request, riding position information and drop off position information on the user terminal 200. Although the details will be described below, the riding position information and drop off position information may be information generated in accordance with a signal that is obtained from the near field wireless communication device that generates a signal when the distance between the user terminal 200 and the vehicle 300 becomes a certain distance or less, or may be information obtained on the basis of the distance between a position represented by position information on the user terminal 200 and a position represented by position information on the vehicle 300 that are obtained by a GPS or the like.

The fare information receiving unit 276 receives information representing the amount to be paid by the user, the amount being calculated on the basis of the riding position information and drop off position information specified by the position information specifying unit 274 and the operation fare of the operation of the vehicle 300.

Functional Configuration of Communication Terminal Sharing Ride

Figure 8:
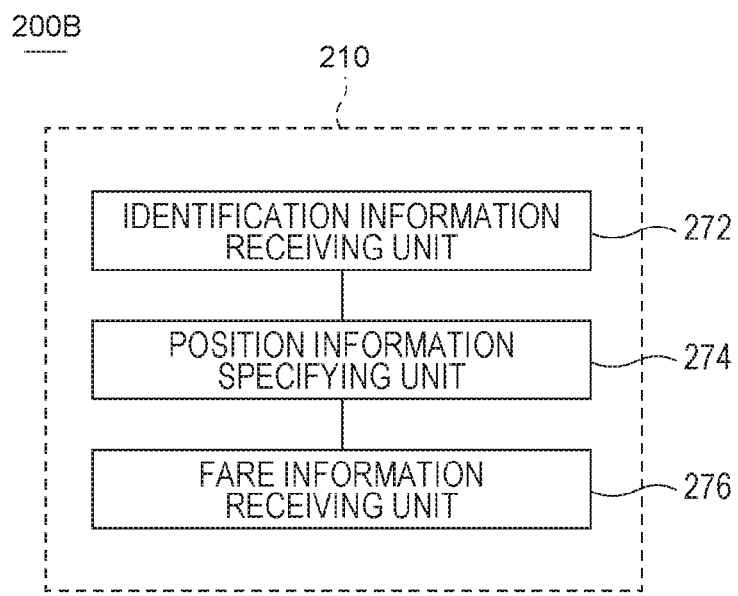
FIG. 8 is a block diagram illustrating the functional configuration of a communication terminal that is used in a shared-ride fare calculation system according to at least one example embodiment.

FIG. 8 is a block diagram illustrating the functional configuration of a communication terminal that is used in a shared-ride fare calculation system according to at least one example embodiment. With reference to FIG. 8, individual functional blocks of the user terminal 200B that shares a ride in the vehicle 300 operated in response to an operation request from the user terminal 200A among the user terminals 200 illustrated in FIG. 2 will be described in more detail. According to FIG. 8, the functional blocks of the user terminal 200B that shares a ride are similar to those of the user terminal 200A of user A who makes an operation request, but are different from those of the user terminal 200A in that the user terminal 200B does not include the operation request signal transmitting unit 270.

The user terminal 200B does not need to make an operation request and thus does not need to include the above-described operation request signal transmitting unit 270. Note that the configuration of the user terminal 200B is not limited thereto, and the user terminal 200B may of course include the operation request signal transmitting unit 270.

Operation Flow of Shared-Ride Fare Calculation System

Figure 9B:
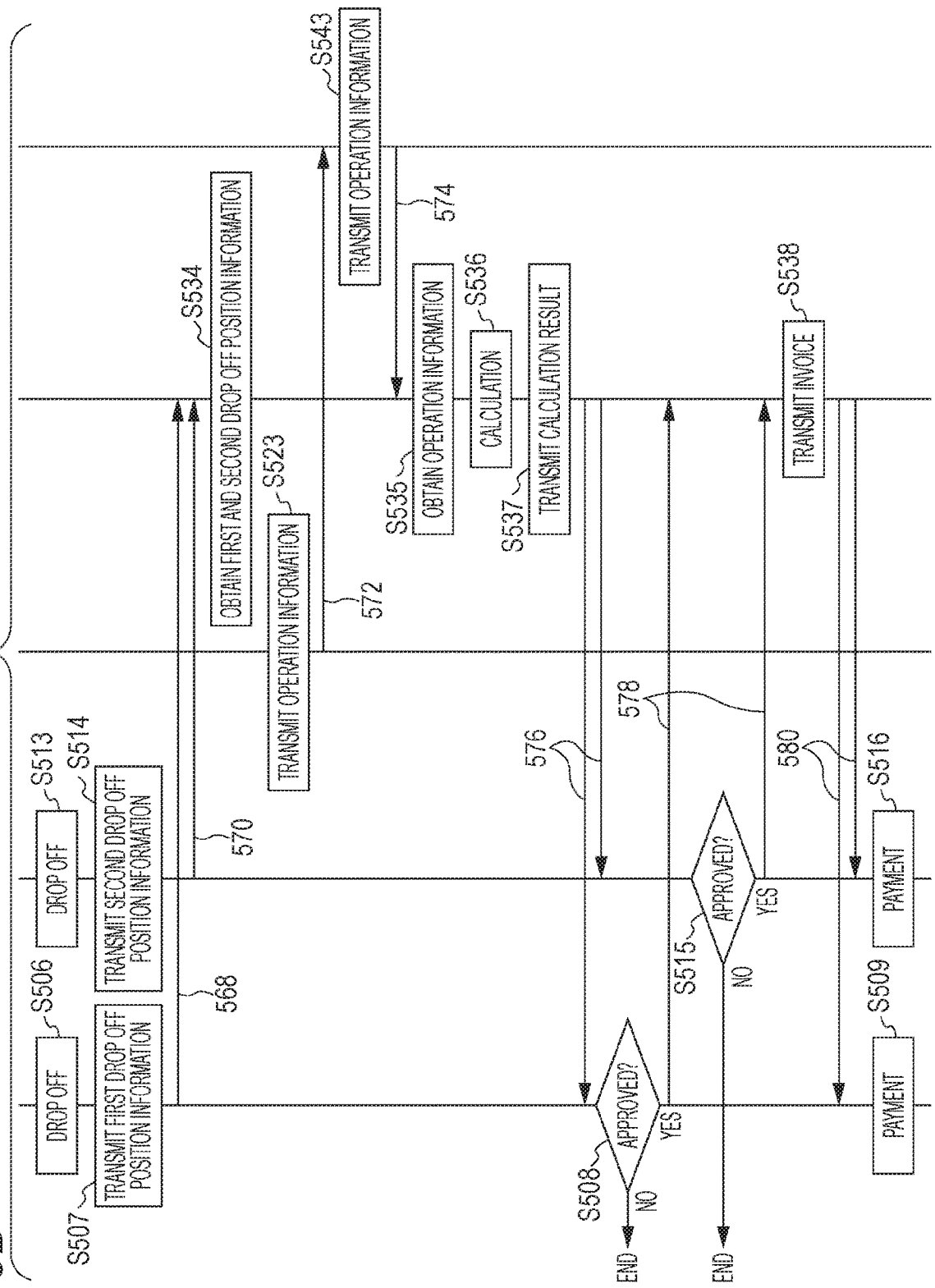

FIGS. 9A and 9B are diagrams illustrating an operation flow of a shared-ride fare calculation system according to at least one example embodiment. With reference to FIGS. 9A and 9B, the operations of the individual blocks of the shared-ride fare calculation system 10 illustrated in FIG. 2 will be described in detail by using a flowchart.

Figure 10:
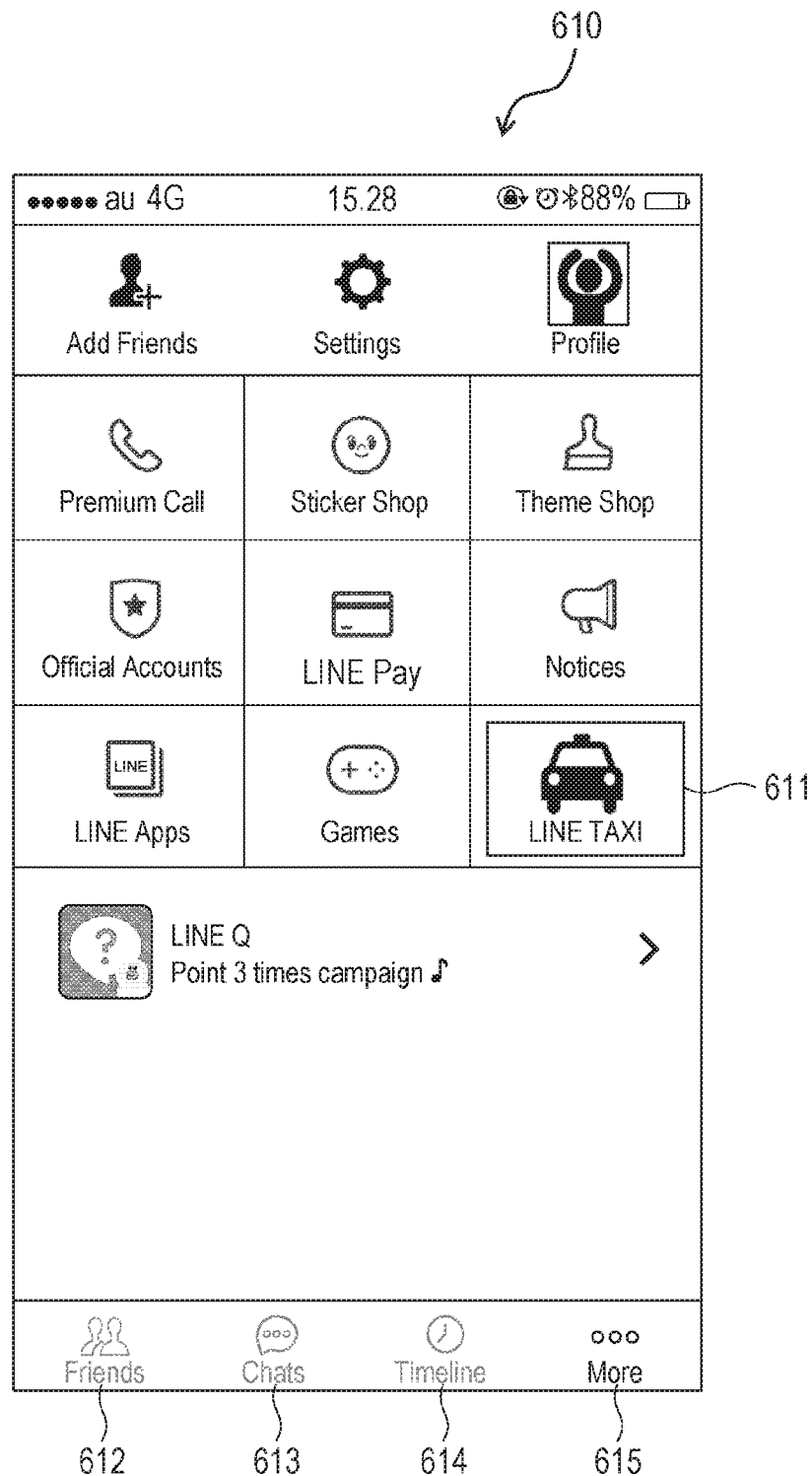
FIG. 10 is a diagram illustrating an example of an interface that is displayed on a user terminal at startup of a program for a shared-ride fare calculation system in an operation flow of a shared-ride fare calculation system according to at least one example embodiment.
Figure 11:
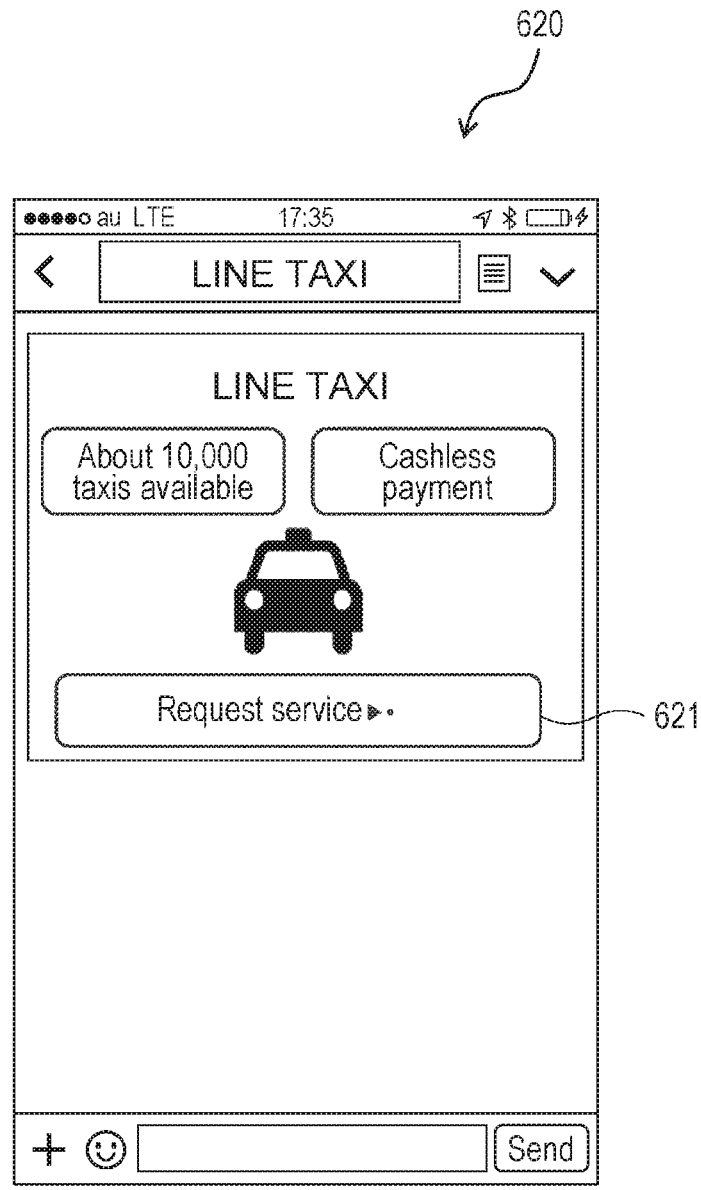
FIG. 11 is a diagram illustrating an example of an interface that is displayed on a user terminal at startup of a program for a shared-ride fare calculation system in an operation flow of a shared-ride fare calculation system according to at least one example embodiment.

First, a program for operating the shared-ride fare calculation system 10 is started by the user terminal 200A (step S501). An example of an interface displayed on the user terminal 200A at the startup of the program of the shared-ride fare calculation system 10 in step S501 is illustrated in FIGS. 10 and 11. An interface 610 illustrated in FIG. 10 is a setting screen in the SNS service provided by the SNS server 130. As illustrated in FIG. 10, the interface 610 includes a vehicle icon 611. With the vehicle icon 611 being selected, the program of the shared-ride fare calculation system 10 is started. The interface 610 includes a plurality of tabs such as a friend list tab 612, a chat tab 613, a timeline tab 614, and a more tab 615, etc., which are arranged on a lower side of the screen. A tab for starting the program of the shared-ride fare calculation system 10 may be arranged as one of the plurality of tabs.

Upon the vehicle icon 611 on the interface 610 being selected, an interface 620 illustrated in FIG. 11 is displayed. The interface 620 is a top screen of the shared-ride fare calculation system 10. With a request button 621 being selected on the interface 620, access from the user terminal 200 to the calculation server 110 can be performed.

Figure 13:
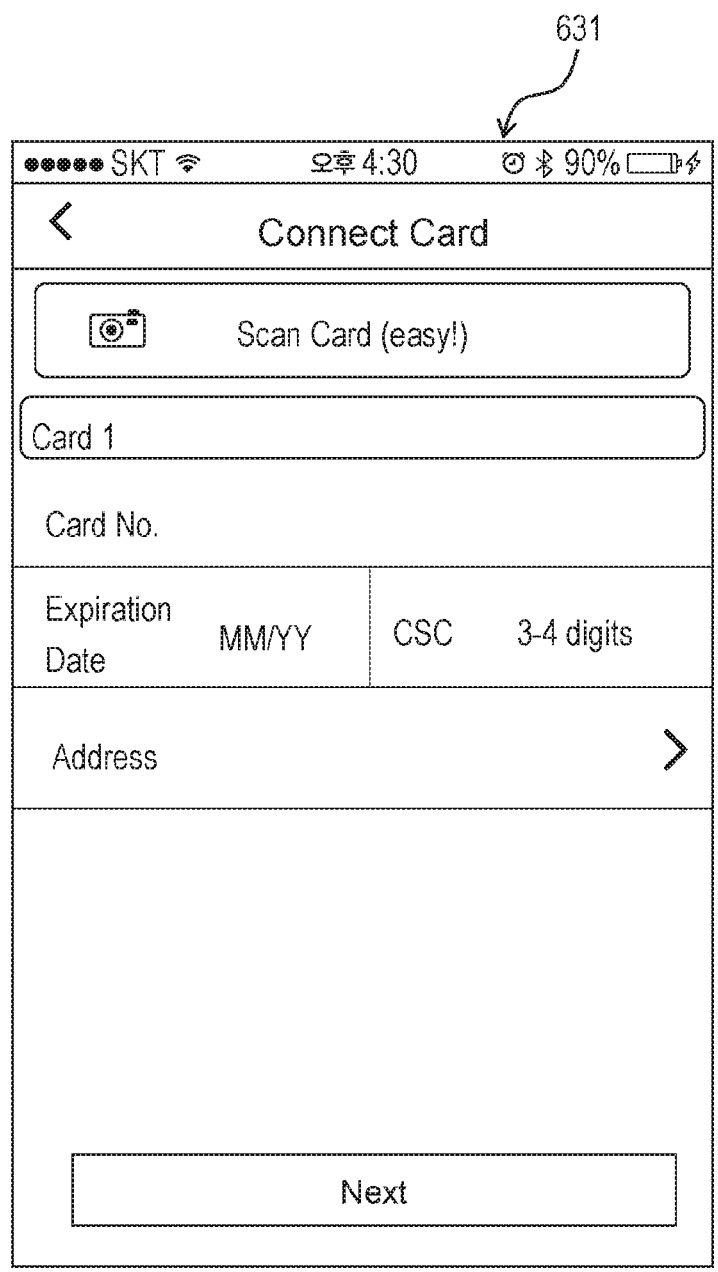
FIG. 13 is a diagram illustrating an example of an interface for user registration in an operation flow of a shared-ride fare calculation system according to at least one example embodiment.

In the case of using the shared-ride fare calculation system 10 for the first time, an interface 630 for user registration illustrated in FIG. 12 and an interface 631 for registering credit card information illustrated in FIG. 13 may be displayed. The interface 630 has at least fields for inputting the name and phone number of the user terminal 200. The interface 631 has at least fields for inputting a credit card number, an expiration date, and a personal identification number, etc.

Figure 14:
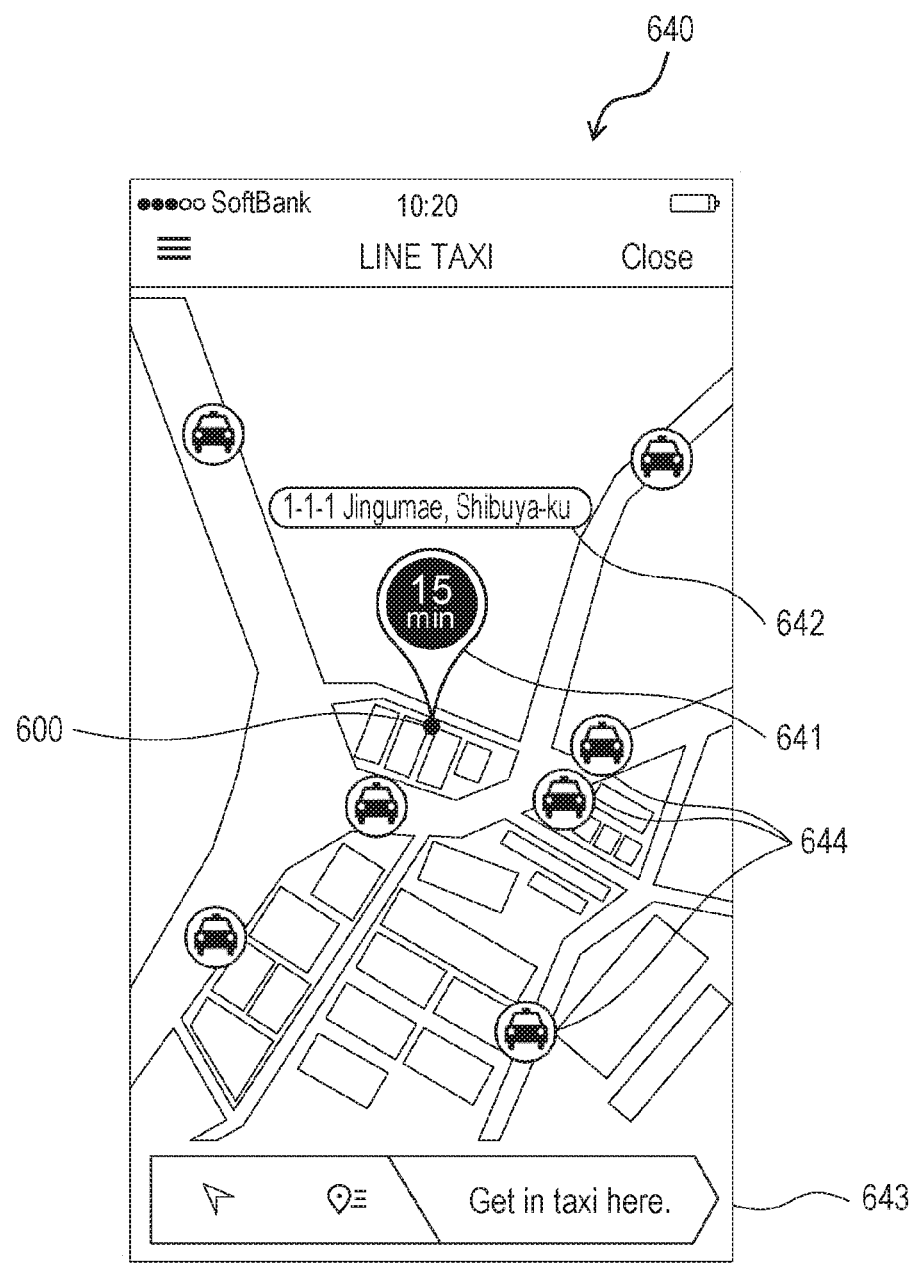
FIG. 14 is a diagram illustrating an example of an interface for inputting a riding position in an operation flow of a shared-ride fare calculation system according to at least one example embodiment.

Subsequently, the user terminal 200A makes an operation request to the vehicle 300 (step S502). An example of an interface displayed on the user terminal 200A when the operation request is made in step S502 is illustrated in FIG. 14. An interface 640 illustrated in FIG. 14 is a map displayed by a WebView function, a map shown on a web browser, a map integrated into the user terminal software application, or the like. The user selects a riding position 600 on the map by using the user terminal 200A. A riding position pin 641 serving as a mark is displayed at the selected riding position 600. Also, a riding position address 642 is displayed above the riding position pin 641. In the case of setting the selected riding position 600, a set button 643 is selected. Accordingly, position information representing the riding position 600 is set as a riding position of the user terminal 200A.

In FIG. 14, a current real-time estimated time to arrival (e.g., 15 min.) to be taken from the current position of the user terminal 200A to the riding position 600 is displayed at the riding position pin 641. Also, a plurality of vehicles 644 managed by the dispatch server 120 are displayed on the map. The function of displaying the riding position address 642, the time to be taken to reach the riding position 600, or the vehicles 644 may be omitted, and may be provided as an optional function.

Figure 15:
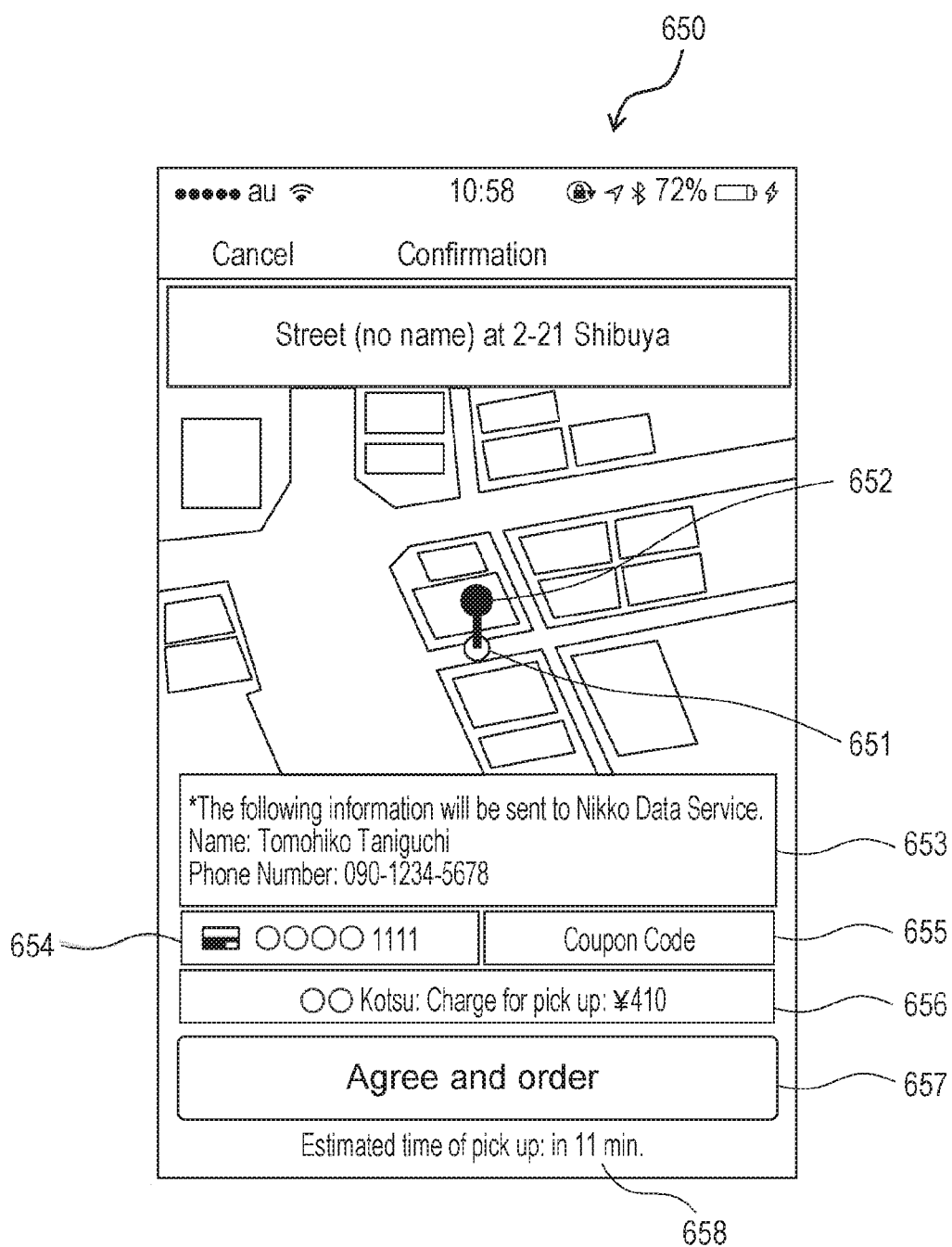
FIG. 15 is a diagram illustrating an example of an interface for determining agreement to transmission of user information in an operation flow of a shared-ride fare calculation system according to at least one example embodiment.

If the set button 643 on the interface 640 illustrated in FIG. 14 is selected in step S502, an interface 650 for confirming agreement to the transmission of the riding position 600 and information on the user terminal 200A to the calculation server 110 is provided, as illustrated in FIG. 15. The interface 650 illustrated in FIG. 15 is a map that is displayed by the WebView function. On the map illustrated in FIG. 15, a position information pin 652 is displayed at a point 651 corresponding to the riding position 600 of the user terminal 200A. With an agreement button 657 being selected by the user terminal 200A, the riding position 600 is transmitted from the user terminal 200A to the calculation server 110.

The interface 650 illustrated in FIG. 15 is also provided with a user information confirmation field 653 showing user information (name, phone number, and so forth) on the user terminal 200, a user registration credit card/payment information field 654 showing credit card information, electronic payment information, bank account information, wire transfer account information, digital currency account information, etc., registered in the shared-ride fare calculation system 10, a coupon code field 655 showing information on a coupon held by the user, a dispatch center information field 656 showing information to be informed to the user terminal from the dispatch center, such as a charge for pick up, and a pick-up information field 658 showing an estimated time of pick up. The interface 650 may have at least a function of confirming agreement. The other functions may be omitted or may be provided as optional functions.

As described above, upon an action of an operation request for the shared-ride fare calculation system 10 is performed by the user terminal 200A, an operation request signal 552 is transmitted from the user terminal 200A to the calculation server 110. Additionally and/or alternatively, steps S501 and S502 may be performed by the user terminal 200B.

Upon the operation request signal 552 transmitted from the user terminal 200A being received by the calculation server 110, an operation request submission signal 554 is transmitted from the calculation server 110 to the dispatch server 120 (step S531). The operation request submission signal 554 transmitted from the calculation server 110 to the dispatch server 120 in step S531 may be transmitted to the dispatch server 120 after a certain period of time (delay period) has elapsed since the confirmation of the operation request in step S502. During the delay period, the calculation server 110 may provide the user terminal 200A with an interface 660 for accepting cancellation of the operation request illustrated in FIG. 16.

Upon the operation request submission signal 554 being received by the dispatch server 120, a pick-up instruction signal 556 is transmitted to one of the vehicles 300 managed by the dispatch center (step S541). In step S541, the dispatch server 120 obtains, via the second network 102 of the dispatch center, information including position information on the vehicles 300 managed by the dispatch center and service statuses of the vehicles 300 (vacant, out of service, pick up, in service, and so forth). On the basis of these pieces of information, the dispatch server 120 specifies one of the vehicles 300 and transmits the pick-up instruction signal 556 to the vehicle 300. If the vehicle 300 that has received the pick-up instruction signal 556 is actually able to pick up a user, an acceptance signal 558 is transmitted from the vehicle 300 to the dispatch server 120 (step S521).

Upon the acceptance signal 558 transmitted from the vehicle 300 being received by the dispatch server 120, an acceptance notification 560 is transmitted from the dispatch server 120 to the calculation server 110 (step S542). Upon the acceptance notification 560 being received by the calculation server 110, a dispatch status notification 562 is transmitted from the calculation server 110 to the user terminal 200A (step S522). The dispatch status notification 562 includes information, such as vehicle information on the vehicle 300 that picks up the user (e.g., vehicle type, vehicle number, driver information, driver photo, service status, and so forth), and information representing the current position of the vehicle 300. The dispatch status notification 562 may further include information representing an estimated time when the vehicle 300 will arrive at the position of the user terminal 200A that will ride the vehicle 300, an estimated time when the vehicle 300 will arrive at the destination 400, traffic jam information, and so forth.

The calculation server 110 may provide the user terminal 200A that has received the dispatch status notification 562 transmitted in step S522 with an interface 670 for making an inquiry of the vehicle 300 that will pick up the user, as illustrated in FIG. 17. In a case where the user wants to make an inquiry of the vehicle 300 that will pick up the user, the user may use the interface 670 illustrated in FIG. 17 to make a phone call, send a text (not shown), and/or other message type, to the driver of the vehicle 300. When the vehicle 300 that will pick up the user arrives at the position of the user terminal 200A, an interface 680 for notifying the user of the arrival of the vehicle 300 may be provided, as illustrated in FIG. 18.

Figure 18:
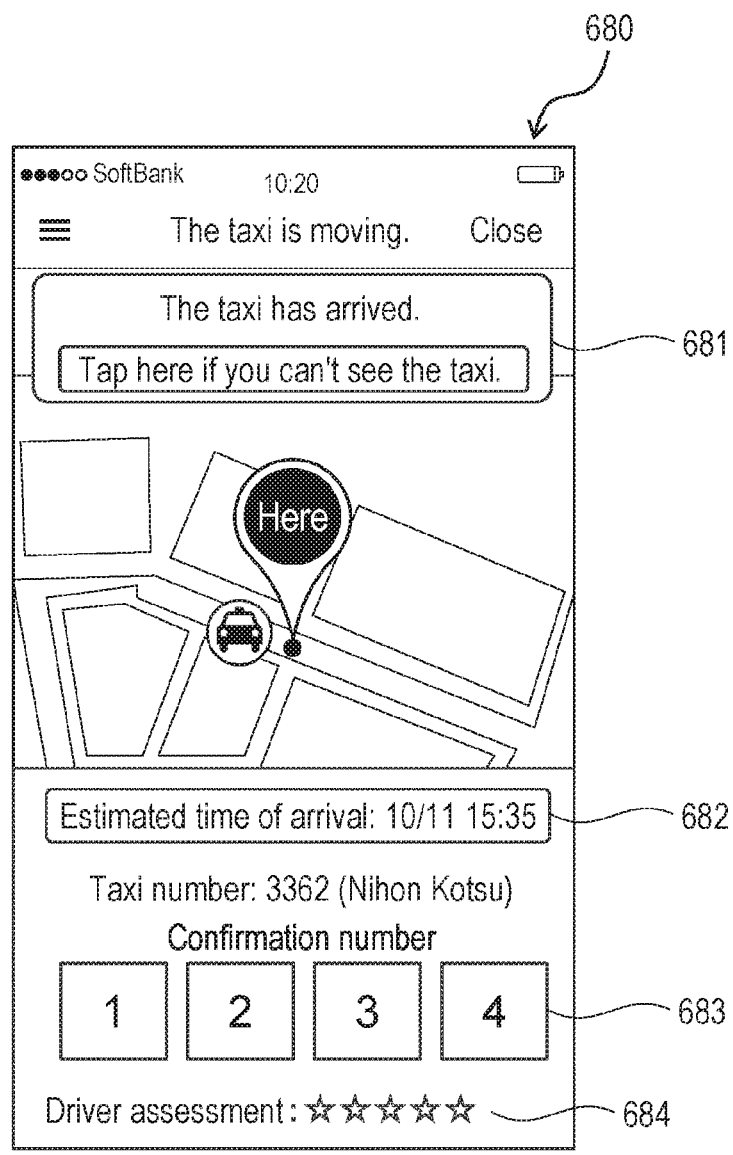
FIG. 18 is a diagram illustrating an example of a screen that is displayed when a vehicle arrives at a position of a user terminal in an operation flow of a shared-ride fare calculation system according to at least one example embodiment.

The interface 680 illustrated in FIG. 18 may include an inquiry button 681, which is used to connect the user terminal 200A to the mobile phone of the driver of the vehicle 300 so as to enable a phone call therebetween in a case where the user cannot see the vehicle 300 (taxi). With pressing of the inquiry button 681, a phone call from the user terminal 200A to the mobile phone of the driver of the vehicle 300 can be automatically made. Additionally and/or alternatively, pressing of the inquiry button 681 may automatically make a phone call from the mobile phone of the driver of the vehicle 300 to the user terminal 200A. The interface 680 may also include an estimated time of arrival 682 at the destination 400, a confirmation number 683 indicating that the user terminal 200A is a terminal that has made the operation request, and a driver assessment 684.

In this way, the user terminal 200A gets in the vehicle 300 (step S503). After the user terminal 200A gets in the vehicle 300 in step S503, first riding position information 564 representing the riding position where the user terminal 200A got in the vehicle 300 is generated and is transmitted to the calculation server 110 (step S504). The first riding position information 564 may be generated by the user terminal 200A on the basis of a relative positional relationship between the user terminal 200A and the vehicle 300, or may be generated by the calculation server 110 on the basis of the relative positional relationship between the user terminal 200A and the vehicle 300. With the first riding position information 564 generated in step S504 being received by the calculation server 110, the calculation server 110 obtains the first riding position information 564 (step S532). The first riding position information 564 includes the user identification information for identifying the user terminals 200A and 200B. Here, the first riding position information 564 includes a user ID held by the user terminal 200A as the user identification information.

The vehicle 300 that has picked up the user terminal 200A moves to the riding position of the user terminal 200B and picks up the user terminal 200B (step S511). After the user terminal 200B gets in the vehicle 300 in step S511, second riding position information 566 representing the riding position where the user terminal 200B got in the vehicle 300 is generated and is transmitted to the calculation server 110 (step S512). The second riding position information 566 may be generated by the user terminal 200B on the basis of a relative positional relationship between the user terminal 200B and the vehicle 300 or a relative positional relationship between the user terminal 200B and the user terminal 200A on the vehicle 300. Alternatively, the second riding position information 566 may be generated by the calculation server 110 on the basis of the relative positional relationship between the user terminal 200B and the vehicle 300 or the relative positional relationship between the user terminal 200B and the user terminal 200A on the vehicle 300. With the second riding position information 566 generated in step S512 being received by the calculation server 110, the calculation server 110 obtains the second riding position information 566 (step S533). The second riding position information 566 includes the user identification information for identifying the user terminals 200A and 200B. Here, the second riding position information 566 includes a user ID held by the user terminal 200B as the user identification information.

When the user terminals 200A and 200B and the vehicle 300 arrive at the destination (step S505), the vehicle 300 drops off the user terminals 200A and 200B (steps S506 and S513). After the vehicle 300 drops off the user terminal 200A in step S506, first drop off position information 568 representing the drop off position where the vehicle 300 dropped off the user terminal 200A is generated and is transmitted to the calculation server 110 (step S507). After the vehicle 300 drops off the user terminal 200B in step S513, second drop off position information 570 representing the drop off position where the vehicle 300 dropped off the user terminal 200B is generated and is transmitted to the calculation server 110 (step S514).

The first drop off position information 568 may be generated by the user terminal 200A on the basis of a relative positional relationship between the user terminal 200A and the vehicle 300, or may be generated by the calculation server 110 on the basis of the relative positional relationship between the user terminal 200A and the vehicle 300. The second drop off position information 570 may be generated by the user terminal 200B on the basis of a relative positional relationship between the user terminal 200B and the vehicle 300, or may be generated by the calculation server 110 on the basis of the relative positional relationship between the user terminal 200B and the vehicle 300.

The first drop off position information 568 and the second drop off position information 570 transmitted from the user terminals 200A and 200B are received (obtained) by the calculation server 110 (step S534). The first drop off position information 568 and the second drop off position information 570 respectively include user identification information for identifying the user terminal 200A and user identification information for identifying the user terminal 200B. For example, a user ID held by the user terminal 200A is included, as the user identification information, in the first drop off position information 568, and a user ID held by the user terminal 200B is included, as the user identification information, in the second drop off position information 570.

When the vehicle 300 arrives at the destination in step S505, operation information 572 including operation identification information and operation fare information is generated by the vehicle 300 and is transmitted to the dispatch server 120 (step S523).

Upon the operation information 572 transmitted from the vehicle 300 being received by the dispatch server 120, operation information 574 including operation identification information and operation fare information is transmitted from the dispatch server 120 to the calculation server 110 (step S543).

Upon the operation information 574 transmitted from the dispatch server 120 being received by the calculation server 110, the calculation server 110 obtains the operation identification information and the operation fare information included in the operation information 574 (step S535). Subsequently, the percentages and amounts of the operation fare to be paid by the individual user terminals 200A and 200B are calculated on the basis of the operation identification information and operation fare information obtained in step S535 (step S536). Subsequently, a calculation result 576 obtained in step S536 (the calculated percentages and/or amounts) is transmitted to the user terminals 200A and 200B (step S537).

Upon the calculation result 576 transmitted from the calculation server 110 being received by the user terminals 200A and 200B, each of the user terminals 200A and 200B determines whether to approve the calculation result 576 (steps S508 and S515). If the calculation result 576 is approved (YES in steps S508 and S515), approval information 578 is transmitted from the user terminals 200A and 200B to the calculation server 110. On the other hand, if the calculation result 576 is not approved (NO in steps S508 and S515), this operation flow ends and the program ends, or the screen moves to the top screen.

Upon the approval information 578 transmitted from the user terminals 200A and 200B being received by the calculation server 110, the calculation server 110 transmits an invoice 580 to the user terminals 200A and 200B (step S538). The user terminals 200A and 200B perform payment for the invoice transmitted in step S538 (steps S509 and S516).

If the calculation result 576 is not approved in steps S508 and S515, the calculation server 110 may charge a single user, such as the user terminal 200A that initially requested the operation, the entire amount of the operation fare, may charge both users equally the amount of the operation fare, or may charge the users using some other calculation.

In the above-described manner, a shared-ride section can be calculated without increasing the burden on the user terminals 200A and 200B and the vehicle 300, and the percentages of an operation fare to be paid by the user terminals 200A and 200B that have shared a ride can be calculated in accordance with the distances traveled by the user terminals 200A and 200B.

Calculation Method for Percentage Calculating Unit

A calculation method for the percentage calculating unit 176 of the calculation server 110 illustrated in FIG. 6 will be described in detail with reference to FIG. 19. A description will be given of an example in which the percentage calculating unit 176 in the shared-ride fare calculation system 10 according to at least one example embodiment calculates the percentages of fare to be paid by the user terminals 200A and 200B on the basis of the percentages of a ride of the user terminals 200A and 200B in a route in which the user terminal 200A at a position relatively far from the destination 400 among the user terminals 200A and 200B is picked up first and then the user terminal 200B is picked up to reach the destination 400.

The percentage calculating unit 176 obtains first riding position information, second riding position information, first drop off position information, and second drop off position information in steps S532 to S534 in the operation flow of the shared-ride fare calculation system 10 illustrated in FIGS. 9A and 9B. On the basis of the obtained position information, the percentage calculating unit 176 calculates a distance Da between the riding position of the user terminal 200A and the riding position of the user terminal 200B and a distance Db between the riding position of the user terminal 200B and the destination 400. A first travel distance of a first section over which the user terminal 200A is on the vehicle 300 is represented by Da+Db, whereas a second travel distance of a second section over which the user terminal 200B shares a ride with the user terminal 200A is represented by Db.

Figure 19:
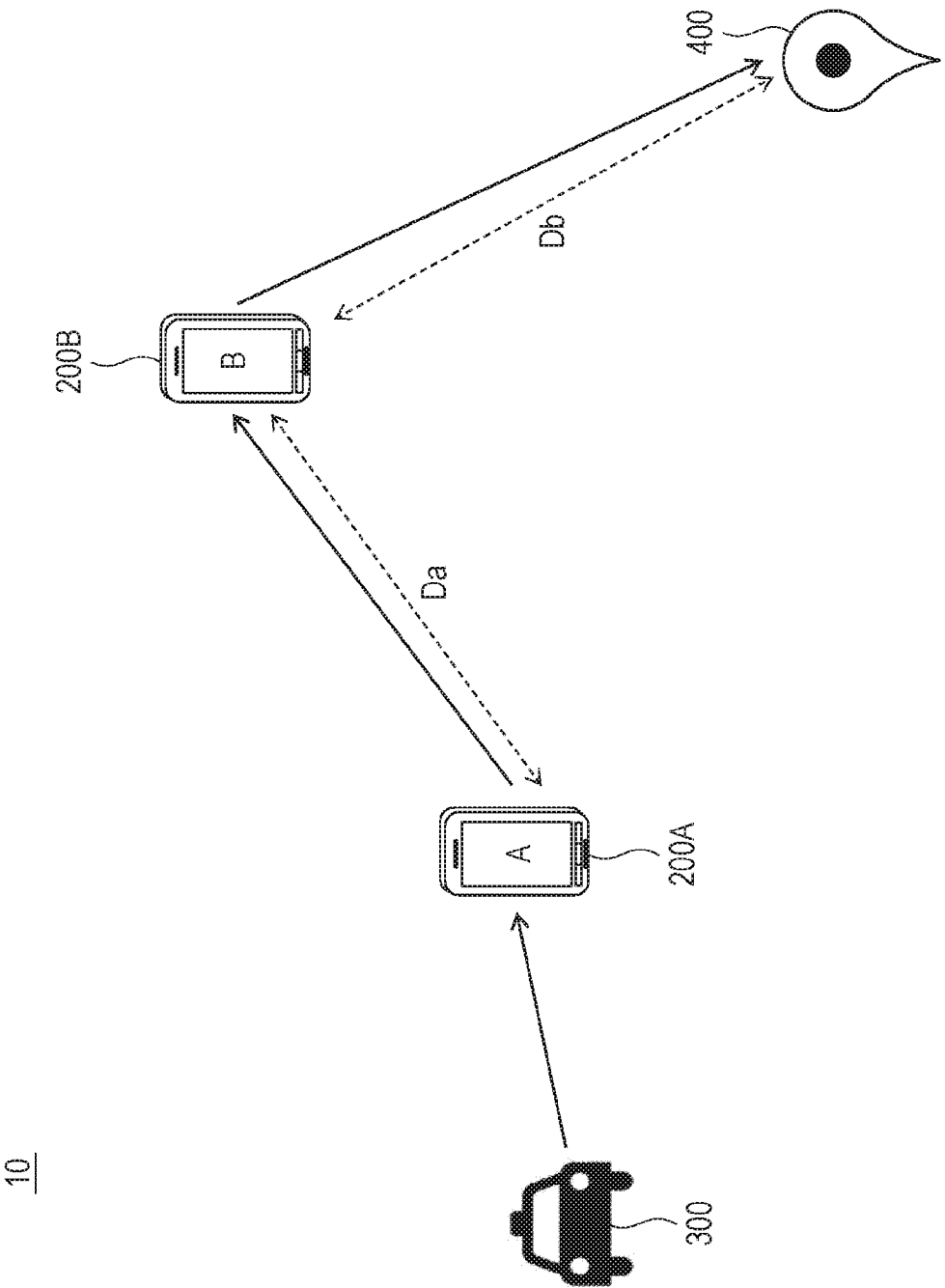
FIG. 19 is a diagram illustrating an overview of a calculation method for a calculation server that is used in a shared-ride fare calculation system according to at least one example embodiment.

In the example embodiment illustrated in FIG. 19, the percentage calculating unit 176 calculates, as a ride percentage, a percentage of the second travel distance (Db) with respect to the first travel distance (Da+Db). Here, a description is given of a method for calculating a ride percentage on the basis of the travel distances in the first and second sections, but the method is not limited thereto. For example, a ride percentage may be calculated on the basis of a second travel time spent traveling the second section with respect to a first travel time spent traveling the first section. In other words, the percentage calculating unit 176 calculates the percentages of fare to be paid for the operation of the vehicle 300 by individual users on the basis of the distances actually traveled by the users utilizing the vehicle 300 or the periods of time actually spent traveling the distances.

The distances Da and Db are distances on a road map. For example, the distance Da is a distance of a route from the riding position of the user terminal 200A to the riding position of the user terminal 200B on the road map. The distance on the road map is not a linear distance between two points but is a distance of a route along a road on a map. However, the distances Da and Db are not limited to distances on the road map and may be linear distances between respective positions.

In the example illustrated in FIG. 19, the percentage calculating unit 176 calculates the percentages of fare to be paid for a route in which the user terminals 200A and 200B get in the vehicle 300 at different positions and are dropped off from the vehicle 300 at the same destination 400, but example embodiments are not limited to this case. For example, the percentage calculating unit 176 may calculate the percentages of fare to be paid for a route in which the user terminals 200A and 200B get in the vehicle 300 at the same position and are dropped off from the vehicle 300 at different destinations. Additionally and/or alternatively, the percentage calculating unit 176 may calculate the percentages of fare to be paid for a route in which the user terminals 200A and 200B get in the vehicle 300 at different positions and are dropped off from the vehicle 300 at different destinations. For example, the percentage calculating unit 176 may calculate the percentages of fare to be paid for a route in which the user terminal 200A gets in the vehicle 300 first, the user terminal 200B gets in the vehicle 300 next, and then the user terminal 200A is dropped off from the vehicle 300 first.

Figure 20:
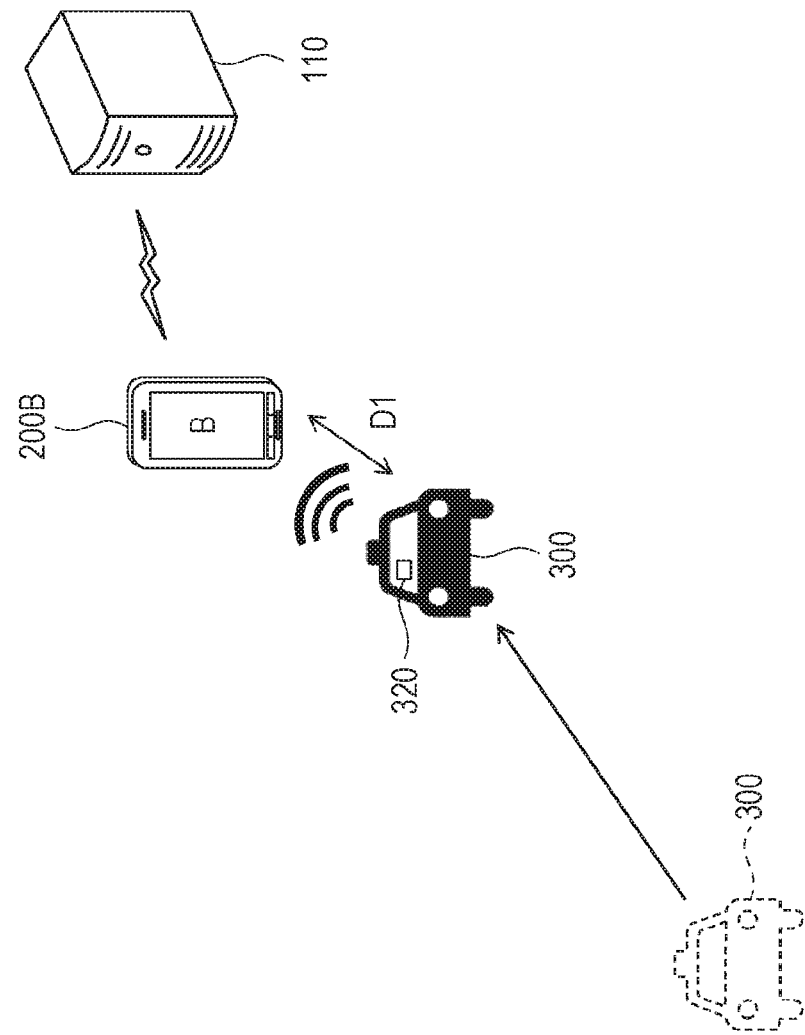
FIG. 20 is a diagram illustrating an example of a method for determining whether a user has gotten in or gotten out of a vehicle in a shared-ride fare calculation system according to at least one example embodiment.

Method for Obtaining Riding Position Information and Drop Off Position Information on User Now, a method for obtaining riding position information and drop off position information on a user by the position information specifying unit 172 will be described in detail with reference to FIG. 20. FIG. 20 is a diagram illustrating an example of a method for determining whether a user has gotten in or gotten out of a vehicle in a shared-ride fare calculation system according to at least one example embodiment. As illustrated in FIG. 20, the vehicle 300 includes the near field wireless communication device 320 that generates a signal when the distance between the user terminal 200B and the vehicle 300 becomes a desired first distance D1 or less. In a case where the vehicle 300 includes the near field wireless communication device 320, the near field wireless communication device 320 may be provided in a point-of-sale (POS) terminal provided in the vehicle 300 or a communication terminal held by the driver.

When the distance between the user terminal 200B and the vehicle 300 becomes the first distance D1 or less, the near field wireless communication device 320 transmits an information signal specific to the near field wireless communication device 320 to the user terminal 200B. That is, the user terminal 200B receives the information signal specific to the near field wireless communication device 320 from the near field wireless communication device 320 when the distance between the user terminal 200B and the vehicle 300 becomes the first distance D1 or less. After receiving the information signal specific to the near field wireless communication device 320, the user terminal 200B transmits information indicating that the specific information signal has been received to the calculation server 110. On the basis of the specific information signal, the position information specifying unit 172 of the calculation server 110 determines that the user terminal 200B has gotten in the vehicle 300 or the user terminal 200B has gotten out of the vehicle 300.

The position information specifying unit 172 obtains the position information representing the position where the user terminal 200B got in the vehicle 300 in the above-described manner, and thereby obtains the second riding position information representing the riding position of the user terminal 200B into the vehicle 300. In the example illustrated in FIG. 20, the user terminal 200B gets in the vehicle 300 which the user terminal 200A is riding in. Thus, the second riding position information corresponds to a start position of a shared ride of the user terminals 200A and 200B.

As described above, according to the shared-ride fare calculation system 10 according to at least one example embodiment, it is possible to provide a calculation server that calculates a shared-ride section without increasing the burden on users and a vehicle driver and that calculates the percentages of fare to be paid by the users who have shared a ride in accordance with the distances traveled by the users, and a communication terminal that communicates with the calculation server.

Figure 21:
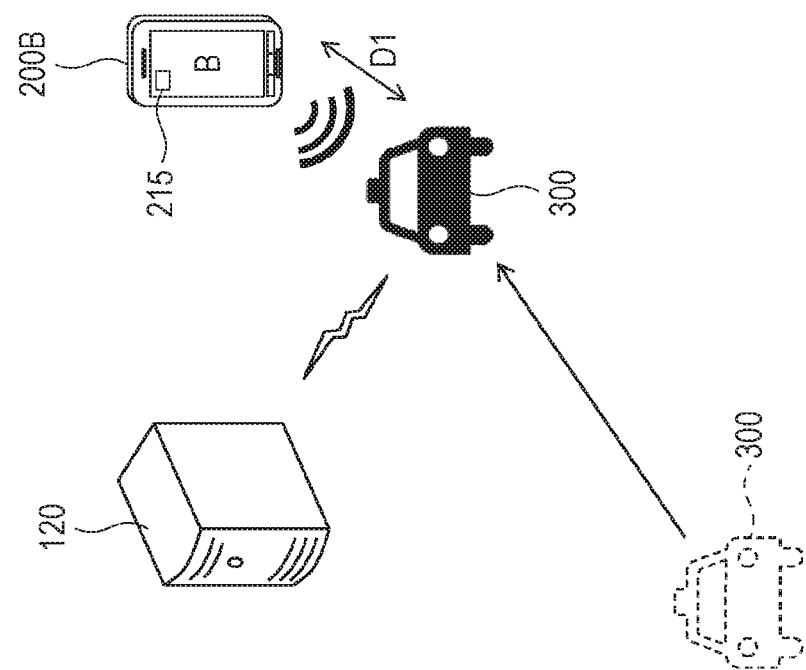
FIG. 21 is a diagram illustrating an example of a method for determining whether a user has gotten in or gotten out of a vehicle in a shared-ride fare calculation system according to a modification example of at least one example embodiment.

An example according to at least one example embodiment will be described with reference to FIG. 21. FIG. 21 is a diagram illustrating an example of a method for determining whether a user has gotten in or gotten out of a vehicle in a shared-ride fare calculation system according to at least one example embodiment. A shared-ride fare calculation system 11 according to FIG. 21 is different from the shared-ride fare calculation system 10 in that the user terminal 200B includes the near field wireless communication device 215 that generates a signal when the distance between the user terminal 200B and the vehicle 300 becomes the desired first distance D1 or less.

The near field wireless communication device 215 transmits an information signal specific to the near field wireless communication device 215 to the vehicle 300 when the distance between the user terminal 200B and the vehicle 300 becomes the first distance D1 or less. That is, the vehicle 300 receives the information signal specific to the near field wireless communication device 215 from the near field wireless communication device 215 when the distance between the user terminal 200B and the vehicle 300 becomes the first distance D1 or less. Upon receiving the information signal specific to the near field wireless communication device 215, the vehicle 300 transmits information indicating that the specific information signal has been received to the dispatch server 120. With the specific information signal being transmitted from the dispatch server 120 to the calculation server 110, the position information specifying unit 172 of the calculation server 110 obtains, on the basis of the specific information signal, second riding position information representing the riding position of the user terminal 200B into the vehicle 300 which the user terminal 200A is riding in. In the example embodiment illustrated in FIG. 21, as in FIG. 20, the user terminal 200B gets in the vehicle 300 which the user terminal 200A is riding in, and thus the second riding position information corresponds to a start position of a shared ride of the user terminals 200A and 200B.

Figure 22:
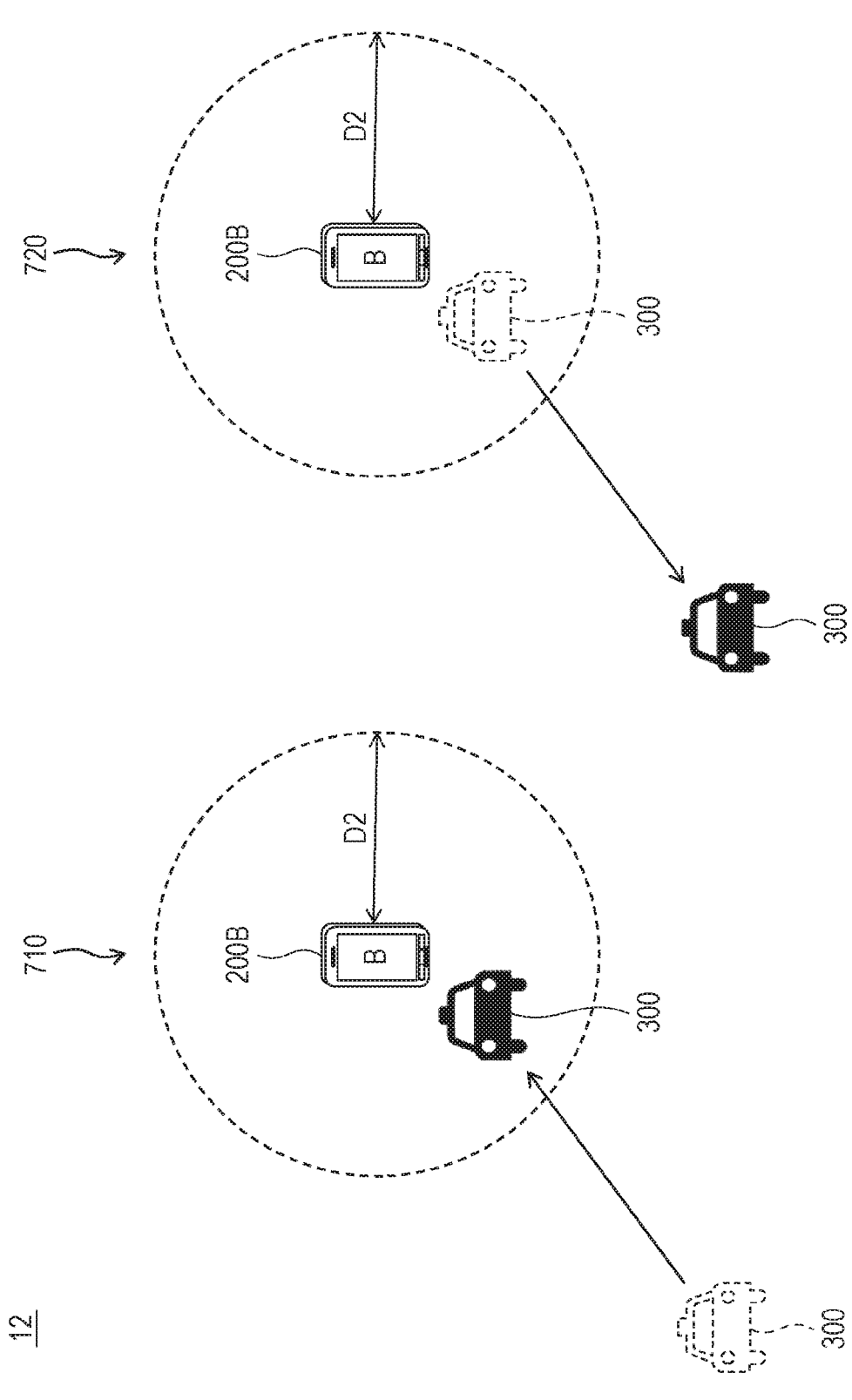
FIG. 22 is a diagram illustrating an example of a method for determining whether a user has gotten in or gotten out of a vehicle in a shared-ride fare calculation system according to a modification example of at least one example embodiment.
Figure 23:
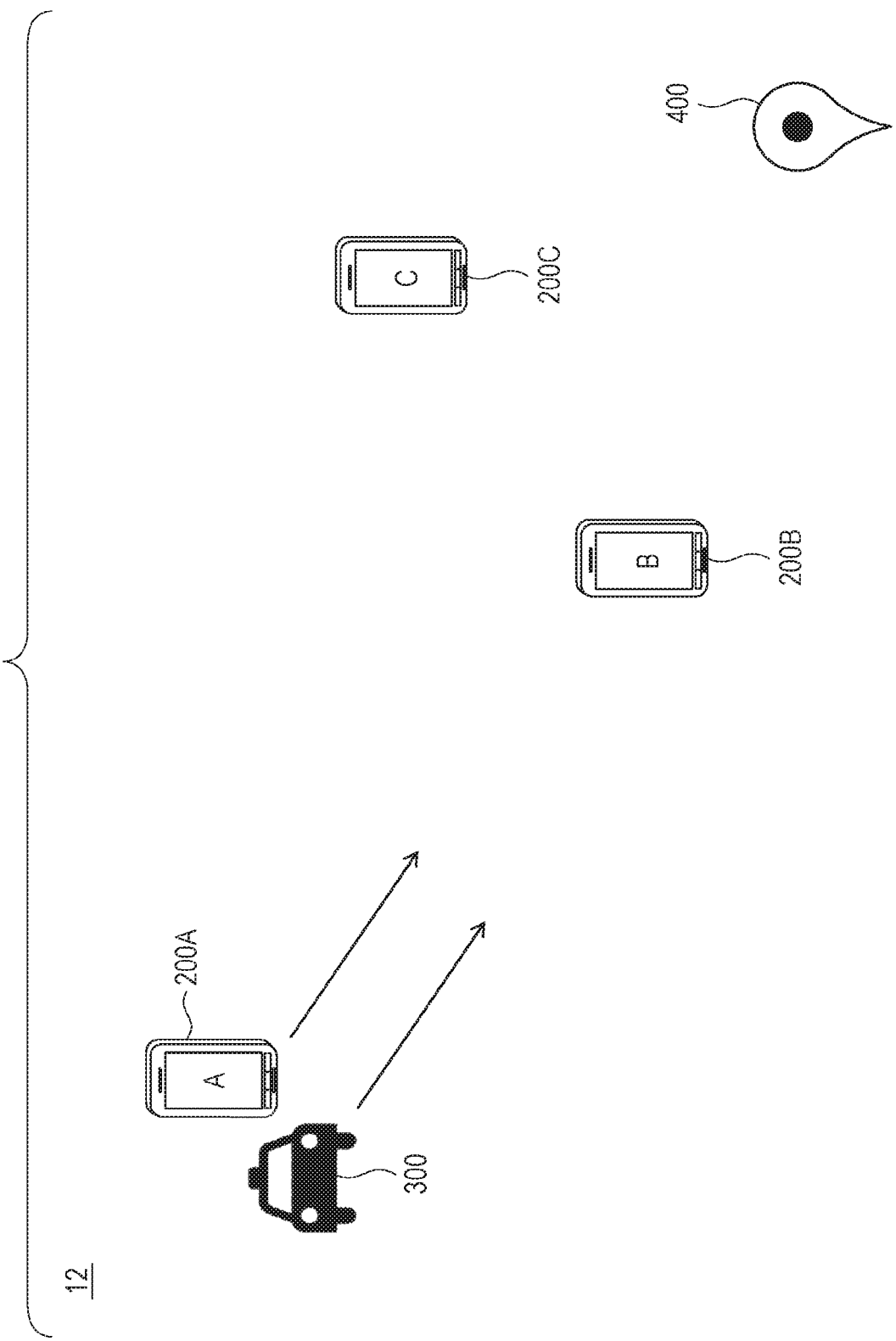
FIG. 23 is a diagram illustrating an example of a method for determining whether a user has gotten in or gotten out of a vehicle in a shared-ride fare calculation system according to a modification example of at least one example embodiment.
Figure 24:
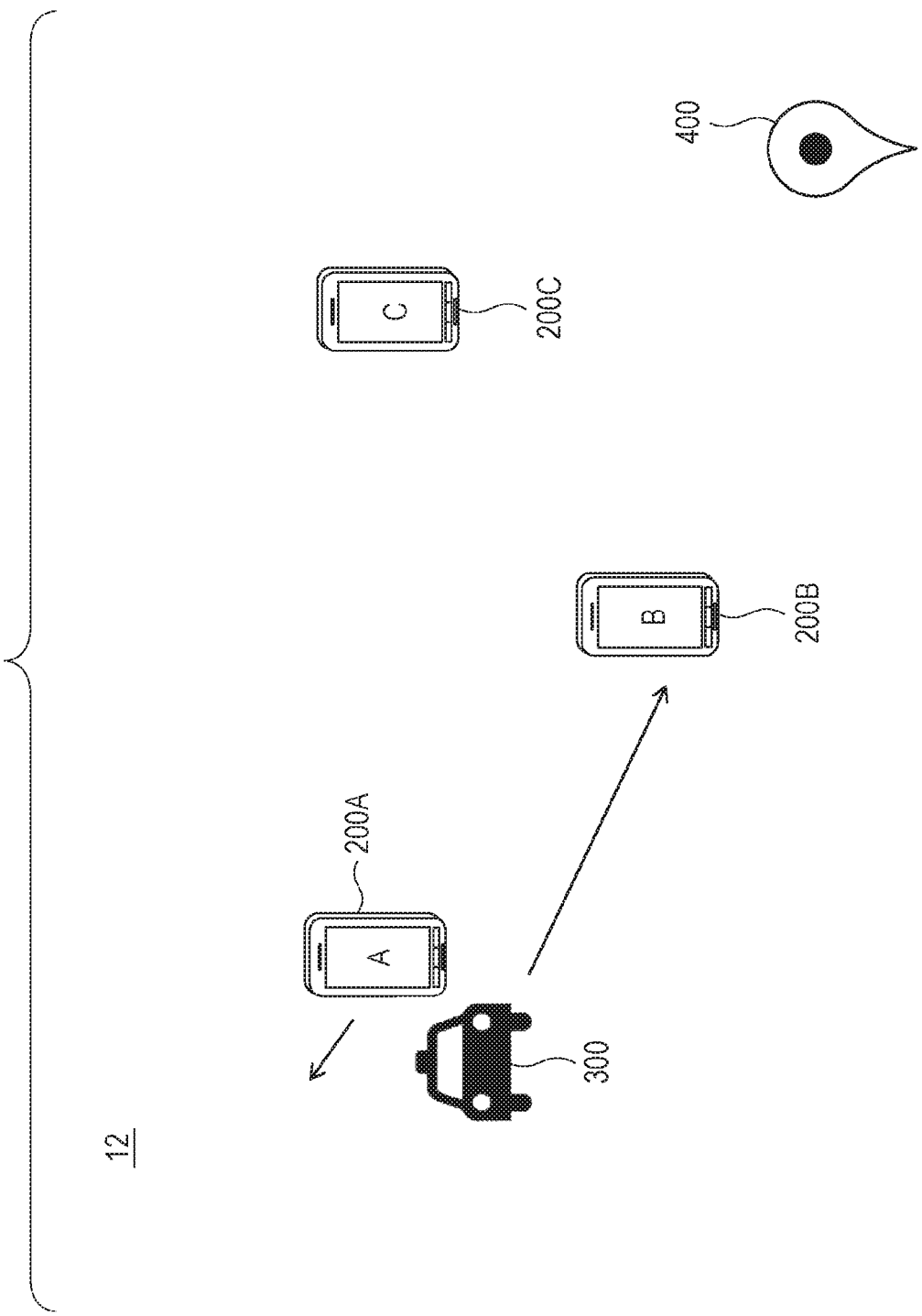
FIG. 24 is a diagram illustrating an example of a method for determining whether a user has gotten in or gotten out of a vehicle in a shared-ride fare calculation system according to a modification example of at least one example embodiment.

An example according to at least one example embodiment will be described with reference to FIGS. 22 to 24. FIG. 22 is a diagram illustrating an example of a method for determining whether a user has gotten in or gotten out of a vehicle in a shared-ride fare calculation system according to at least one example embodiment. As illustrated in FIG. 22, the position information specifying unit 172 of a shared-ride fare calculation system 12 determines that the user terminal 200B has gotten in the vehicle 300 in a case where the distance between a position represented by position information on the user terminal 200B and a position represented by position information on the vehicle 300 is a second distance D2 or less. The position information specifying unit 172 obtains second riding position information representing the position where the user terminal 200B got in the vehicle 300 on the basis of the position information on the user terminal 200B or the vehicle 300 when it is determined that the user terminal 200B has gotten in the vehicle 300.

On the other hand, when the distance between a position represented by position information on the user terminal 200B and a position represented by position information on the vehicle 300 becomes larger than the second distance D2, the position information specifying unit 172 determines that the vehicle 300 has dropped off the user terminal 200B. The position information specifying unit 172 obtains second drop off position information representing the position where the vehicle 300 dropped off the user terminal 200B on the basis of the position information on the user terminal 200B or the vehicle 300 when it is determined that the vehicle 300 has dropped off the user terminal 200B.

Specifically, as in a riding determination 710 illustrated in FIG. 22, it is determined that the user terminal 200B has gotten in the vehicle 300 when the vehicle 300 enters an area of a radius of the second distance D2 around the user terminal 200B. Also, as in a drop off determination 720, it is determined that the vehicle 300 has dropped off the user terminal 200B when the vehicle 300 goes out of the area of a radius of the second distance D2 around the user terminal 200B.

Next, a description will be given of a function for further increasing the accuracy of riding/drop off determination. FIG. 23 is a diagram illustrating an example of a method for determining whether a user has gotten in or gotten out of a vehicle in a shared-ride fare calculation system according to at least one example embodiment. As illustrated in FIG. 23, in a case where the distance between a position represented by position information on the user terminal 200A and a position represented by position information on the vehicle 300 is the desired second distance D2 or less and in a case where the user terminal 200A and the vehicle 300 are moving in the same direction, the position information specifying unit 172 may determine that the user terminal 200A is in the vehicle 300. On the other hand, in a case where the vehicle 300 is moving in a direction different from the user terminal 200A as illustrated in FIG. 24, the position information specifying unit 172 may determine that the vehicle 300 has dropped off the user terminal 200A.

Figure 25:
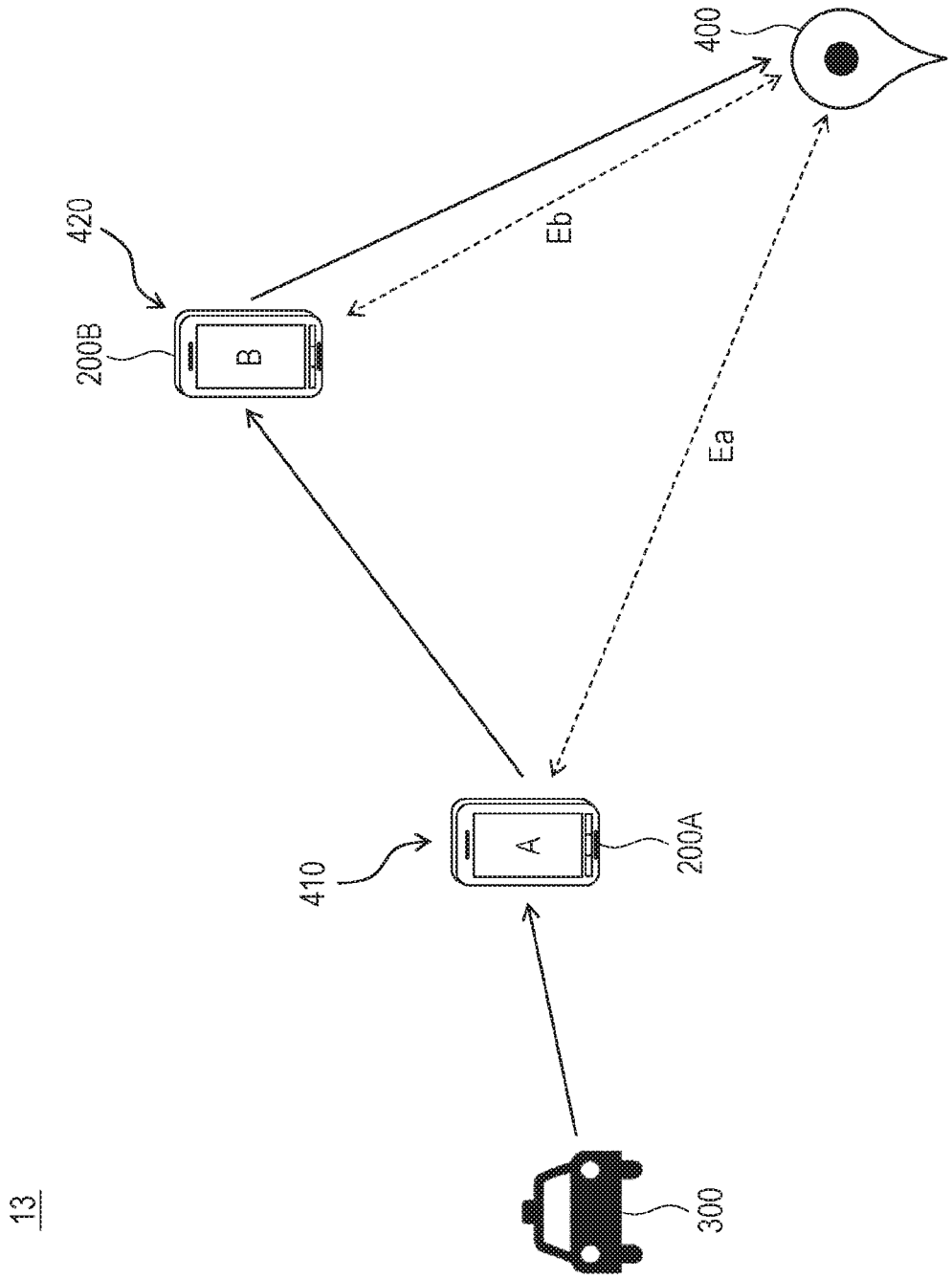
FIG. 25 is a diagram illustrating an overview of a calculation method for a calculation server that is used in a shared-ride fare calculation system according to a modification example of at least one example embodiment.

An example according to at least one example embodiment will be described with reference to FIGS. 25 to 27. FIG. 25 is a diagram illustrating an overview of a calculation method for a calculation server that is used in a shared-ride fare calculation system according to at least one example embodiment.

Calculation Method for Percentage Calculating Unit

As illustrated in FIG. 25, the percentage calculating unit 176 calculates the percentages of fare to be paid, on the basis of a first estimated distance Ea from a first riding position 410 of the user terminal 200A (first user) that gets in the vehicle 300 first to the destination 400 and a second estimated distance Eb from a second riding position 420 of the user terminal 200B (second user) that gets in the vehicle 300 after the user terminal 200A to share a ride with the user terminal 200A to the destination 400. The first estimated distance Ea is a distance that would be traveled by the user terminal 200A from the first riding position 410 to the destination 400 without sharing a ride, and the second estimated distance Eb is a distance that would be traveled by the user terminal 200B from the second riding position 420 to the destination 400 without sharing a ride. In other words, the percentage calculating unit 176 calculates the percentages of the fare to be paid by the individual user terminals 200A and 200B on the basis of the distances that would be traveled by the user terminals 200A and 200B if each of the user terminals 200A and 200B independently utilizes the vehicle 300 from a riding position to a drop off position. The first estimated distance Ea and the second estimated distance Eb are distances on the road map. The first estimated distance Ea and the second estimated distance Eb are not limited to distances on the road map, and may be linear distances between the positions.

Method for Obtaining Riding Position Information and Drop Off Position Information on User Next, a description will be given of a method for obtaining first riding position information on the first riding position 410 and second riding position information on the second riding position 420 with reference to FIGS. 26 and 27. Here, a description will be given of a case where the vehicle 300 includes the near field wireless communication device 320. FIGS. 26 and 27 are diagrams illustrating an example of a method for determining whether a user has gotten in or gotten out of a vehicle in a shared-ride fare calculation system according to at least one example embodiment.

Figure 26:
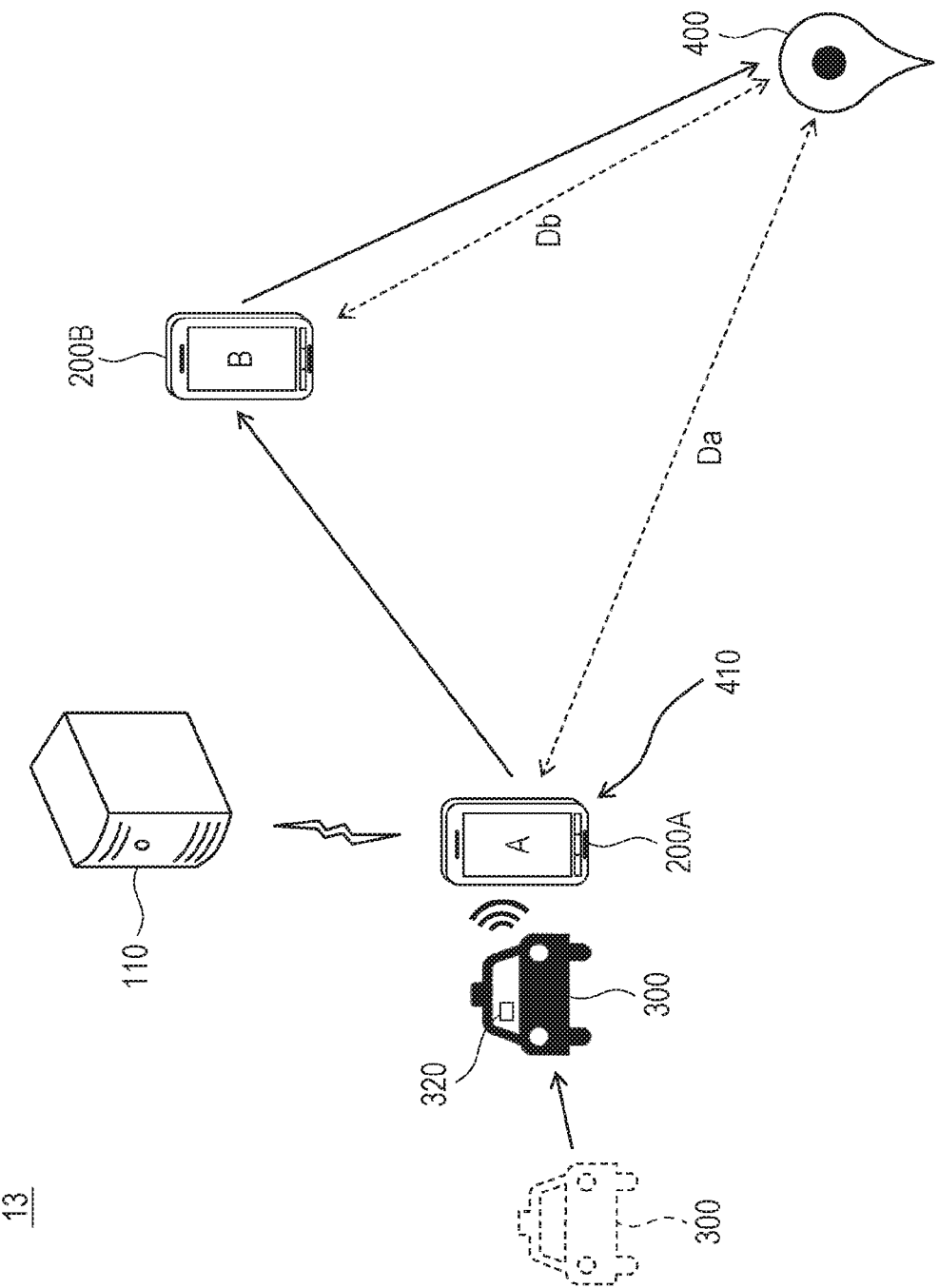
FIG. 26 is a diagram illustrating an example of a method for determining whether a user has gotten in or gotten out of a vehicle in a shared-ride fare calculation system according to a modification example of at least one example embodiment.

As illustrated in FIG. 26, when the distance between the user terminal 200A and the vehicle 300 becomes a desired and/or certain distance or less, the user terminal 200A receives an information signal specific to the near field wireless communication device 320 from the near field wireless communication device 320. Upon receiving the specific information signal, the user terminal 200A transmits information indicating that the specific information signal has been received to the calculation server 110. On the basis of the specific information signal, the calculation server 110 determines that the user terminal 200A has gotten in the vehicle 300. Accordingly, the position information specifying unit 172 obtains first riding position information representing the riding position where the user terminal 200A got in the vehicle 300.

Figure 27:
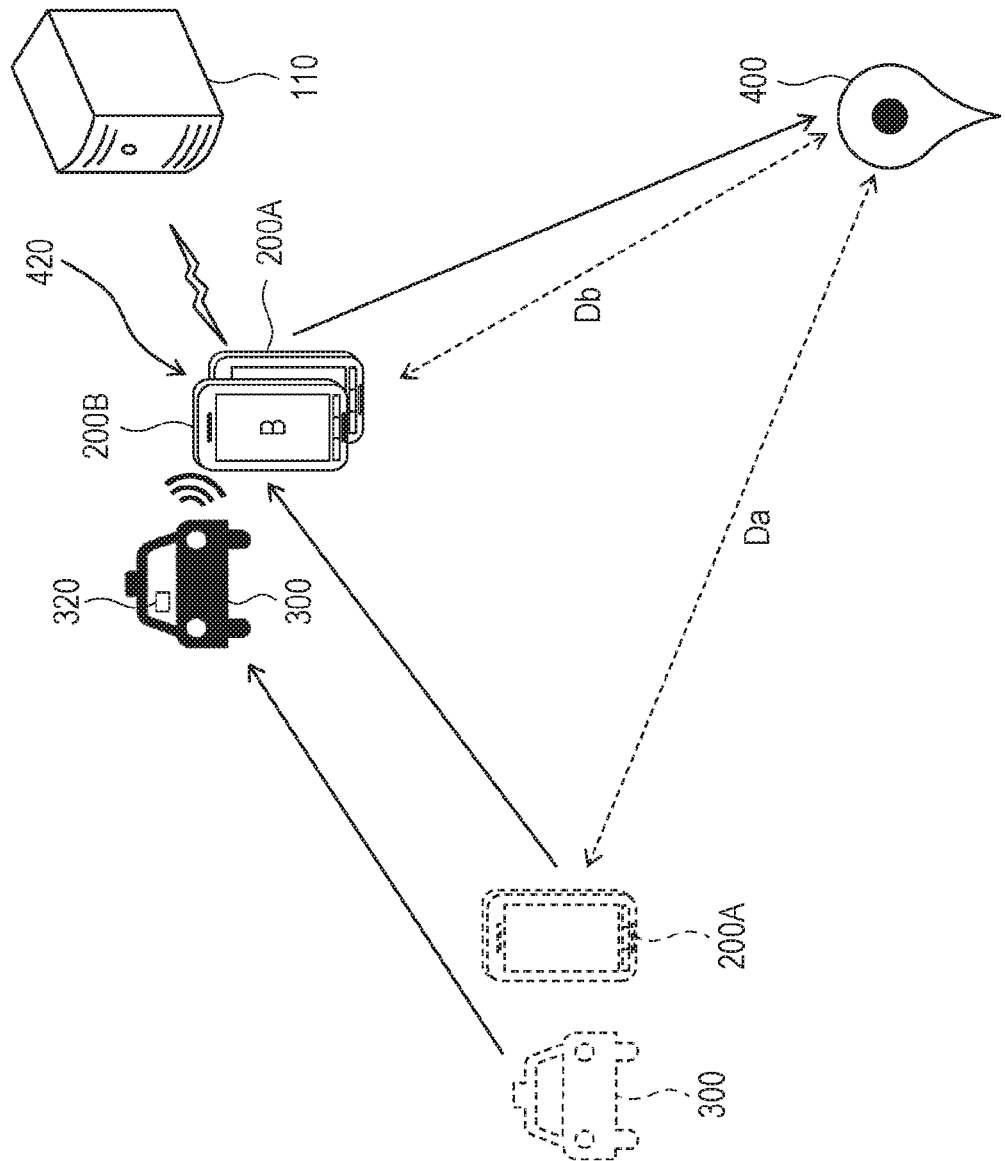
FIG. 27 is a diagram illustrating an example of a method for determining whether a user has gotten in or gotten out of a vehicle in a shared-ride fare calculation system according to a modification example of at least one example embodiment.

As illustrated in FIG. 27, when the distance between the user terminal 200B and the vehicle 300 becomes a desired and/or certain distance or less, the user terminal 200B receives an information signal specific to the near field wireless communication device 320 from the near field wireless communication device 320. Upon receiving the specific information signal, the user terminal 200B transmits information indicating that the specific information signal has been received to the calculation server 110. On the basis of the specific information signal, the calculation server 110 determines that the user terminal 200B has gotten in the vehicle 300. Accordingly, the position information specifying unit 172 obtains second riding position information representing the riding position where the user terminal 200B got in the vehicle 300.

When the user terminals 200A and 200B and the vehicle 300 arrive at the destination 400, the vehicle 300 drops off the user terminals 200A and 200B, and the user terminals 200A and 200B become unable to receive an information signal specific to the near field wireless communication device 320 from the near field wireless communication device 320, it is determined that the vehicle 300 has dropped off the user terminals 200A and 200B. After that, the position information specifying unit 172 obtains first drop off position information and second drop off position information representing drop off positions where the vehicle 300 dropped off the user terminals 200A and 200B.

In the case of utilizing a shared ride in the routes illustrated in FIGS. 25 to 27, there is no difference in the distance traveled by the user terminal 200B between the case of utilizing a shared ride and the case of not utilizing a shared ride, but there is a difference in the distance traveled by the user terminal 200A between the case of utilizing a shared ride and the case of not utilizing a shared ride. That is, the distance traveled by the user terminal 200A is longer than necessary in the case of sharing a ride with the user terminal 200B. With a shared-ride fare calculation system 13 according to at least one example embodiment, the percentages of fare to be paid can be fairly calculated even in such a case.

As described above, according to the shared-ride fare calculation system 13 according to at least one example embodiment, it is possible to provide a calculation server that calculates a shared-ride section without increasing the burden on users and a vehicle driver and that calculates the percentages of fare to be paid by the users who have shared a ride in accordance with the distances traveled by the users, and a communication terminal that communicates with the calculation server. Further, in the case of moving to a destination by sharing a ride, the percentages of fare to be paid can be fairly calculated even in a case where the distance traveled becomes longer than necessary compared to the case of moving to the destination without sharing a ride.

Figure 28:
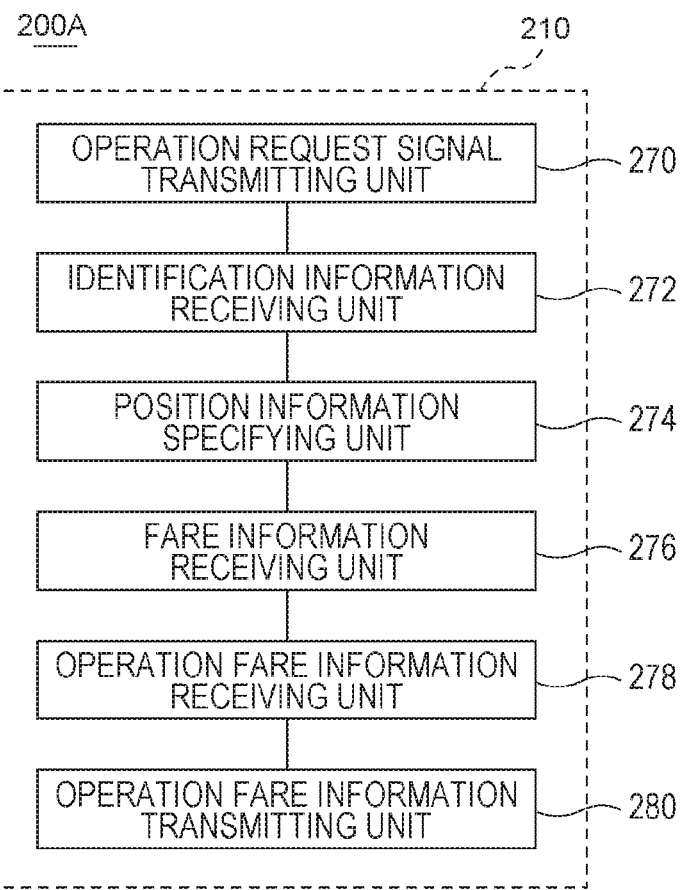
FIG. 28 is a block diagram illustrating the functional configuration of a communication terminal that is used in a shared-ride fare calculation system according to at least one example embodiment.
Figure 29:
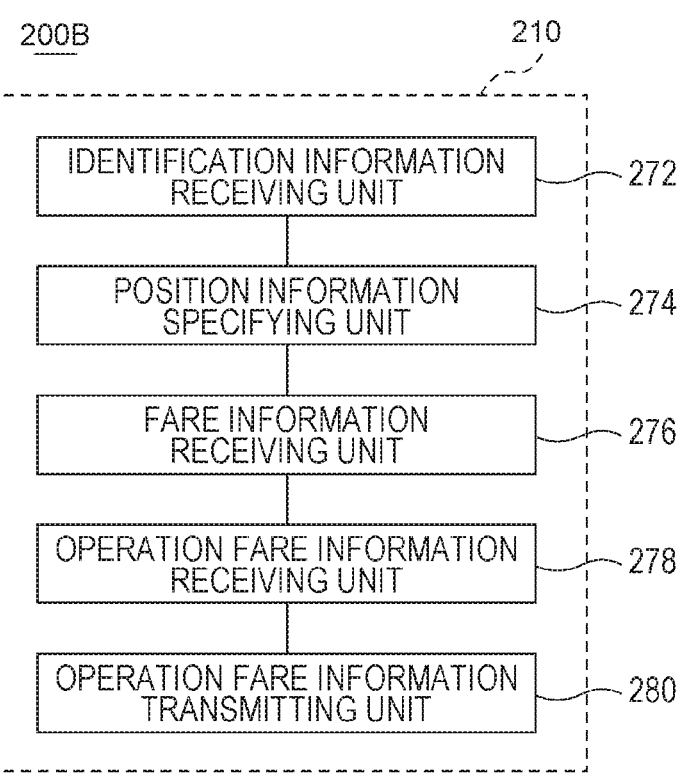
FIG. 29 is a block diagram illustrating the functional configuration of a communication terminal that is used in a shared-ride fare calculation system according to at least one example embodiment.

Another shared-ride fare calculation system according to at least one example embodiment will be descried in detail with reference to FIGS. 28 and 29. The overview of the shared-ride fare calculation system, the hardware configuration of the calculation server, the hardware configuration of the user terminal, and the hardware configuration of the vehicle are the same as those of the shared-ride fare calculation system 10, and thus the description thereof is omitted here. According to this example embodiment, the user terminal 200 communicates with a fare meter of the vehicle 300 and thereby receives information representing an operation fare from the vehicle 300. The user terminal 200 may directly communicate with the fare meter of the vehicle 300, or the user terminal 200 may communicate with the fare meter of the vehicle 300 via the dispatch server 120 and/or the calculation server 110.

Functional Configuration of Communication Terminal Requesting Operation

A description will be given of a communication terminal that is used in a shared-ride fare calculation system 20 according to the second embodiment and that makes an operation request. The functional configuration of the user terminal 200A that is used in the shared-ride fare calculation system 20 is similar to that of the user terminal 200A that is used in the shared-ride fare calculation system 10 according to the example embodiment illustrated in FIG. 7, but is different therefrom in including an operation fare information receiving unit 278 and an operation fare information transmitting unit 280. The operation fare information receiving unit 278 receives, from the fare meter of the vehicle 300, operation fare information including information representing an operation fare. The operation fare information transmitting unit 280 transmits the operation fare information received by the operation fare information receiving unit 278 to the calculation server 110. The operation fare information receiving unit 278 does not need to directly communicate with the vehicle 300 or the fare meter of the vehicle 300, and may communicate with the vehicle 300 or the fare meter of the vehicle 300 via the dispatch server 120 and/or the calculation server 110.

Functional Configuration of Communication Terminal Sharing Ride

FIG. 29 is a block diagram illustrating the functional configuration of a communication terminal that is used in a shared-ride fare calculation system according to at least one example embodiment. With reference to FIG. 29, a more detailed description will be given of the functional blocks of the user terminal 200B that shares a ride in the vehicle 300 operated in response to an operation request made by the user terminal 200A, among the user terminals illustrated in FIG. 2. According to FIG. 29, the functional blocks of the user terminal 200B that shares a ride are similar to those of the user terminal 200A of user A who makes an operation request, but are different therefrom in not including the operation request signal transmitting unit 270.

The user terminal 200B does not need to make an operation request and thus does not need to include the operation request signal transmitting unit 270. However, the configuration of the user terminal 200B is not limited thereto, and the user terminal 200B may of course include the operation request signal transmitting unit 270.

As described above, according to the shared-ride fare calculation system 20 according to at least one example embodiment, it is possible to provide a calculation server that calculates a shared-ride section without increasing the burden on users and a vehicle driver and that calculates the percentages of fare to be paid by the users who have shared a ride in accordance with the distances traveled by the users, and a communication terminal that communicates with the calculation server. Further, by allowing the fare meter of the vehicle 300 and the user terminal 200 to communicate with each other, more efficient data communication can be performed.

The calculation server and communication terminal described above in the example embodiments can be implemented by a program or application that operates a computer included in the calculation server and the communication terminal. The program or application can be downloaded to the calculation server and communication terminal through Internet and/or other data communications and can be installed thereinto. Alternatively, the program or application can be installed into the calculation server and communication terminal via a non-transitory computer readable medium.

The example embodiments as disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

What is claimed is:

1. An information processing method of an information processing apparatus communicating with a first terminal of a first user riding in a vehicle and a second terminal of a second user riding in the vehicle, the information processing method comprising:
    acquiring, using at least one processor of the information processing apparatus, a first user input on a map included in a first graphical user interface from the first terminal, the first user input indicating a desired first riding position;
    transmitting, using the at least one processor, a real-time estimated time to arrive to the desired first riding position by the vehicle based on the acquired first user input, wherein the transmitting causes the first terminal to display the real-time estimated time to arrive on the map of the first graphical user interface;
    transmitting, using the at least one processor, a confirmation message to the first terminal, the confirmation message indicating personal information of the first user to be transmitted to the vehicle;
    transmitting, using the at least one processor, the desired first riding position and the personal information of the first user to the vehicle in response to receiving an order request from the first terminal;
    acquiring, using the at least one processor, at least first riding position information, first drop off position information, second riding position information, and second drop off position information from the first terminal via a first network and the second terminal via the first network, respectively,
        the first riding position information including information of a position where the first user enters the vehicle and acquired based on a first wireless communication between an electronic apparatus of the vehicle and the first terminal on a second network,
        the first drop off position information including information of a position where the vehicle drops off the first user and acquired based on a disconnection of the first wireless communication between the electronic apparatus and the first terminal on the second network,
        the second riding position information including information of a position where the second user enters the vehicle and acquired based on a second wireless communication between the electronic apparatus and the second terminal on the second network,
        the second drop off position information including information of a position where the vehicle drops off the second user and acquired based on a disconnection of the second wireless communication between the electronic apparatus and the second terminal on the second network;
    receiving, using the at least one processor, operation information related to the first user and the second user from a dispatch server, the dispatch server receiving the operation information from the vehicle over the second network;
    calculating, using the at least one processor, information related to a first fare and a second fare based on at least the first riding position information, the first drop off position information, the second riding position information and the second drop off position information acquired from the first terminal via the first network and the second terminal via the first network, respectively, and the operation information received from the dispatch server,
        the first fare being a fare for the first user among a plurality of passenger fares of the vehicle, and the second fare being a fare for the second user among the plurality of passenger fares;
    transmitting, using the at least one processor, the information related to the first fare to the first terminal via the first network; and
    transmitting, using the at least one processor, the information related to the second fare to the second terminal via the first network.

2. The information processing method according to claim 1, further comprising:
    receiving, using the at least one processor, the first riding position information from the electronic apparatus or the first terminal; and
    receiving, using the at least one processor, the second riding position information from the electronic apparatus or the second terminal.

3. The information processing method according to claim 1, wherein
    the information related to the first fare is based on a distance traveled between the first riding position information and the first drop off position information; and
    the information related to the second fare is based on a distance traveled between the second riding position information and the second drop off position information.

4. The information processing method according to claim 1, wherein
    the vehicle moves to a position based on the first riding position information, a position based on the second riding position information, a position based on the first drop off position information, and a position based on the second drop off position information in this order; and
    the plurality of passenger fares are based on a distance traveled between the first riding position information and the second drop off position information.

5. The information processing method according to claim 4, wherein
    a distance traveled between the first riding position information and the first drop off position information is longer than a distance traveled between the second riding position information and the second drop off position information; and
    the first fare is more expensive than the second fare.

6. The information processing method according to claim 1, the method further comprising:
    calculating, using the at least one processor, the first fare based on a distance traveled between the first riding position information and the first drop off position information based on the first user independently utilizing the vehicle, or calculating, using the at least one processor, the second fare based on a distance traveled between the second riding position information and the second drop off position information based on the second user independently utilizing the vehicle.

7. The information processing method according to claim 1, further comprising:

transmitting, using the at least one processor, information related to the plurality of passenger fares instead of information related to the first fare to the first terminal upon receiving information indicating rejection of a payment for the second fare from the second terminal.

8. The information processing method according to claim 1, further comprising:

transmitting, using the at least one processor, map information to the first terminal and the second terminal, the map information including at least an operation route.

9. The information processing method according to claim 1, wherein the first network is associated with a social networking service (SNS).

10. The information processing method according to claim 1, wherein the second network is associated with an in-vehicle wireless network.

11. A non-transitory computer-readable storage medium storing computer readable instructions for execution by an information processing apparatus communicating with a first terminal of a first user riding in a vehicle and a second terminal of a second user riding in the vehicle, the computer readable instructions causing the information processing apparatus to perform a method comprising:

acquiring a first user input on a map included in a first graphical user interface from the first terminal, the first user input indicating a desired first riding position;

transmitting a real-time estimated time to arrive to the desired first riding position by the vehicle based on the acquired first user input, wherein the transmitting causes the first terminal to display the real-time estimated time to arrive on the map of the first graphical user interface;

transmitting a confirmation message to the first terminal, the confirmation message indicating personal information of the first user to be transmitted to the vehicle;

transmitting the desired first riding position and the personal information of the first user to the vehicle in response to receiving an order request from the first terminal;

acquiring at least first riding position information, first drop off position information, second riding position information, and second drop off position information from the first terminal via a first network and the second terminal via the first network, respectively, the first riding position information including information of a position where the first user enters the vehicle and acquired based on a first wireless communication between an electronic apparatus of the vehicle and the first terminal on a second network, the first drop off position information including information of a position where the vehicle drops off the first user and acquired based on a disconnection of the first wireless communication on the second network, the second riding position information including information of a position where the second user enters the vehicle and acquired based on a second wireless communication between the electronic apparatus and the second terminal on the second network, the second drop off position information including information of a position where the vehicle drops off the second user and acquired based on a disconnection of the second wireless communication on the second network;

receiving operation information related to the first user and the second user from a dispatch server, the dispatch server receiving the operation information from the vehicle over the second network;

calculating information related to a first fare and a second fare based on at least the first riding position information, the first drop off position information, the second riding position information and the second drop off position information acquired from the first terminal via the first network and the second terminal via the first network, respectively, and the operation information received from the dispatch server, the first fare being a fare for the first user among a plurality of passenger fares of the vehicle, and the second fare being a fare for the second user among the plurality of passenger fares;

transmitting the information related to the first fare to the first terminal via the first network; and transmitting the information related to the second fare to the second terminal via the first network.

12. An information processing method of a first terminal of a first user, the first terminal communicating with an information processing apparatus on a first network and an electronic apparatus of a vehicle on a second network, the information processing method comprising:

receiving, using at least one processor of the first terminal, a first user input on a map included in a first graphical user interface from the first terminal, the first user input indicating a desired first riding position;

receiving, using the at least one processor, from the information processing apparatus on the first network, a real-time estimated time to arrive to the desired first riding position by the vehicle based on the received first user input, the receiving including displaying the real-time estimated time to arrive on the map of the first graphical user interface;

receiving, using the at least one processor, a confirmation message from the information processing apparatus on the first network, the confirmation message indication personal information of the first user to be transmitted to the vehicle;

transmitting, using the at least one processor, an order request to the information processing apparatus over the first network, the order request causing the information processing apparatus to transmit to the vehicle the desired first riding position and the personal information of the first user to the vehicle;

communicating, using the at least one processor, with the electronic apparatus via a wireless communication on the second network; and receiving, using the at least one processor, from the information processing apparatus on the first network at least information related to a first fare between information related to the first fare and information related to a second fare, the first fare being a fare for the first user among a plurality of passenger fares of the vehicle, the second fare being a fare for a second user among the plurality of passenger fares, the first and the second fares being calculated based on at least a first riding position information, a first drop off position information, a second riding position information, a second drop off position information, and operation information related to the first user and the second user transmitted by the vehicle to a dispatch server over the second network, the first riding position information including information of a position where the first user enters the vehicle and acquired based on a first wireless communication between the electronic apparatus and the first terminal on the second network, the first drop off position information including information of a position where the vehicle drops off the first user and acquired based on a disconnection of the first wireless communication between the electronic apparatus and the first terminal on the second network, the second riding position information including information of a position where the second user of a second terminal enters the vehicle and acquired based on a second wireless communication between the electronic apparatus and the second terminal on the second network, and the second drop off position information including information of a position where the vehicle drops off the second user and acquired based on a disconnection of the second wireless communication between the electronic apparatus and the second terminal on the second network.

13. The information processing method according to claim 12, further comprising:
receiving, using the at least one processor, the first riding position information from the electronic apparatus or the first terminal; and
receiving, using the at least one processor, the second riding position information from the electronic apparatus or the second terminal.

14. The information processing method according to claim 12, wherein
the information related to the first fare is based on a distance traveled between the first riding position information and the first drop off position information; and
the information related to the second fare is based on a distance traveled between the second riding position information and the second drop off position information.

15. The information processing method according to claim 12, wherein
the vehicle moves to a position based on the first riding position information, a position based on the second riding position information, a position based on the first drop off position information, and a position based on the second drop off position information in this order; and
the plurality of passenger fares are decided based on a distance traveled between the first riding position information and the second drop off position information.

16. The information processing method according to claim 12, wherein
a distance traveled between the first riding position information and the first drop off position information is longer than a distance traveled between the second riding position information and the second drop off position information; and
the first fare is more expensive than the second fare.

17. The information processing method according to claim 12, the method further comprising:

calculating, using the at least one processor, the first fare based on a distance traveled between the first riding position information and the first drop off position information based on the first user independently utilizing the vehicle; or
calculating, using the at least one processor, the second fare based on a distance traveled between the second riding position information and the second drop off position information based on the second user independently utilizing the vehicle.

18. The information processing method according to claim 12, further comprising:
receiving, using the at least one processor, information related to the plurality of passenger fares instead of information related to the first fare upon receiving information indicating rejection of a payment for the second fare from the second terminal.

19. A non-transitory computer-readable storage medium storing computer readable instructions, which when executed by at least one processor of a first terminal of a first user, causes the at least one processor to:
receive a first user input on a map included in a first graphical user interface from the first terminal, the first user input indicating a desired first riding position;
receive, from at least one server via a first network, a real-time estimated time to arrive to the desired first riding position by a vehicle based on the received first user input, the receiving including displaying the real-time estimated time to arrive on the map of the first graphical user interface;
receive, from the at least one server via the first network, a confirmation message, the confirmation message indicating personal information of the first user to be transmitted to the vehicle;
transmit, to the at least one server via the first network, an order request, the order request causing the at least one server to transmit to the vehicle the desired first riding position and the personal information of the first user to the vehicle;
communicate with an electronic apparatus of the vehicle via wireless communication on a second network; and
receive at least information related to a first fare between information related to the first fare and information related to a second fare from the at least one server via the first network, the first fare being a fare for the first user among a plurality of passenger fares of the vehicle, the second fare being a fare for a second user among the plurality of passenger fares, the first and the second fares being calculated based on at least a first riding position information, a first drop off position information, a second riding position information, a second drop off position information, and operation information related to the first user and the second user transmitted by the vehicle to a dispatch server over the second network,
the first riding position information including information of a position where the first user enters the vehicle and acquired based on a first wireless communication between the electronic apparatus and the first terminal on the second network,
the first drop off position information including information of a position where the vehicle drops off the first user and acquired based on a disconnection of the first wireless communication between the electronic apparatus and the first terminal on the second network, the second riding position information including information of a position where the second user of a second terminal enters the vehicle and acquired based on a second wireless communication between the electronic apparatus and the second terminal on the second network, and the second drop off position information including information of a position where the vehicle drops off the second user and acquired based on a disconnection of the second wireless communication between the electronic apparatus and the second terminal on the second network.

20. The information processing method according to claim 9, further comprising:

obtaining, using the at least one processor, user identification information corresponding to the first user and the second user from the SNS.

* * * * *